US012649857B2

(12) United States Patent (10) Patent No.: US 12,649,857 B2
Sakai et al. (45) Date of Patent: Jun. 9, 2026

(54) CATIONIC ELECTRODEPOSITION COATING COMPOSITION

(71) Applicant: NIPPON PAINT AUTOMOTIVE COATINGS CO., LTD., Osaka (JP)

(72) Inventors: Namiko Sakai, Hirakata (JP); Masayuki Kotani, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 983 days.

(21) Appl. No.: 17/624,404

(22) PCT Filed: Jul. 3, 2020

(86) PCT No.: PCT/JP2020/026266
§ 371 (c)(1),
(2) Date: Jan. 3, 2022

(87) PCT Pub. No.: WO2021/006220
PCT Pub. Date: Jan. 14, 2021

(65) Prior Publication Data
US 2022/0332960 A1 Oct. 20, 2022

(30) Foreign Application Priority Data
Jul. 11, 2019 (JP) ................................. 2019-129248

(51) Int. Cl.
| | |
|---|---|
| *C09D 5/44* | (2006.01) |
| *C08K 3/10* | (2018.01) |
| *C09D 7/61* | (2018.01) |
| *C09D 7/65* | (2018.01) |
| *C09D 163/00* | (2006.01) |

(52) U.S. Cl.
CPC .............. *C09D 5/4473* (2013.01); *C08K 3/10* (2013.01); *C09D 5/4488* (2013.01); *C09D 5/4492* (2013.01); *C09D 7/61* (2018.01); *C09D 7/65* (2018.01); *C09D 163/00* (2013.01)

(58) Field of Classification Search
CPC .......... C09D 5/4473; C09D 7/65; C09D 7/61; C09D 5/4492; C09D 163/00; C08K 3/10; C08G 77/46
See application file for complete search history.

(56) References Cited

U.S. PATENT DOCUMENTS

| | | | |
|---|---|---|---|
| 6,033,545 A | 3/2000 | Kaylo et al. | |
| 2006/0084725 A1* | 4/2006 | Gam ................... | C09D 175/04 523/415 |
| 2016/0333197 A1 | 11/2016 | Herrmann et al. | |
| 2018/0282557 A1* | 10/2018 | Gam ........................ | C09D 7/65 |
| 2020/0407590 A1 | 12/2020 | Kotani et al. | |
| 2021/0198523 A1* | 7/2021 | Stone ....................... | C09D 5/44 |

FOREIGN PATENT DOCUMENTS

| | | | |
|---|---|---|---|
| CN | 103992716 | 8/2014 | |
| CN | 106883690 | 6/2017 | |
| EP | 0255727 A1 * | 2/1988 | ............... C09D 5/44 |
| EP | 3 354 701 | 8/2018 | |
| EP | 3354701 A1 * | 8/2018 | ............... C09D 7/61 |
| JP | H05140489 A * | 6/1993 | |
| JP | 2009-280803 | 12/2009 | |
| JP | 2012-92293 | 5/2012 | |
| JP | 2017-508025 | 3/2017 | |
| WO | 2017/051901 | 3/2017 | |
| WO | 2020/129817 | 6/2020 | |

OTHER PUBLICATIONS

Momentive Technical Document, "Release Solutions for Molding Challenges: Silicone-based fluids, emulsions, resins, and copolymers", 2024. (Year: 2024).*
Safety Data Sheet (SDS) for TEGO Wet 265 from Evonik. Issued Mar. 6, 2019 and Revised Nov. 15, 2024. (Year: 2019).*
Safety Data Sheet (SDS) for SILWET L-7280 from Momentive. Version 4.1, Revision Date: Jan. 25, 2024. (Year: 2024).*
"Silicone Fluids: Stable, Inert Media," from Gelest, Inc. copyright 2012, p. 21-22. (Year: 2012).*
International Preliminary Report on Patentability and Written Opinion of the International Searching Authority issued Jan. 11, 2022 in International (PCT) Application No. PCT/JP2020/026266.
International Search Report (ISR) issued Sep. 15, 2020 in International (PCT) Application No. PCT/JP2020/026266.
Extended European Search Report issued Jun. 9, 2023 in corresponding European Patent Application No. 20836845.6.

* cited by examiner

*Primary Examiner* — James Lin
*Assistant Examiner* — Kevin Sylvester
(74) *Attorney, Agent, or Firm* — Wenderoth, Lind & Ponack, L.L.P.

(57) ABSTRACT

Provided is a cationic electrodeposition coating composition having good anti-cratering performance. A cationic electrodeposition coating composition comprising a coating film-forming resin (A), a metal compound (B) containing a trivalent metal element, and a silicone compound (C), wherein a content of the metal compound (B) is 0.03 parts by mass or more and less than 4 parts by mass in terms of a metal element based on 100 parts by mass of a resin solid content of the coating film-forming resin (A), and a content of the silicone compound (C) is 0.005 parts by mass or more and 4.5 parts by mass or less based on 100 parts by mass of the resin solid content of the coating film-forming resin (A).

6 Claims, No Drawings

CATIONIC ELECTRODEPOSITION COATING COMPOSITION

TECHNICAL FIELD

The present invention relates to a cationic electrodeposition coating composition.

BACKGROUND ART

A plurality of coating films having various roles are formed on the surface of an article to be coated such as a metal substrate, etc. A coating film protects an article to be coated and, at the same time, imparts a beautiful appearance to the article. Commonly, as a coating film for imparting corrosion resistance to an article to be coated, electrodeposition coating films formed by electrodeposition coating have widely been used. Coating can be applied by electrodeposition coating in detailed portions of an article even if the article has a complicated shape. Furthermore, by electrodeposition coating, coating can be provided to an article automatically and continuously. Therefore, electrodeposition coating has widely been used as an under coating method particularly for articles to be coated having a large and complicated shape such as vehicle bodies or the like. As such electrodeposition coating, electrodeposition coating using a cationic electrodeposition coating composition has widely been used.

A coating film is required to impart corrosion resistance to an article to be coated and is also required to have good surface condition. One of the factors that decrease the smoothness of the coating film is, for example, a phenomenon called cratering. The term "cratering" as used herein refers to surface defects (depressions/holes) of the coating film surface that is formed in a series of coating/drying steps. In general, components (causative substances) that cause such surface defects are often unintentionally brought into a coating composition from, for example, a raw material of the coating composition, a production device, a container, a substrate to be coated, or the like. It is difficult to completely exclude such causative substances from the coating composition.

For example, JP-A-2012-092293 (Patent Literature 1) describes a pigment dispersion paste for electrodeposition coating material, the pigment dispersion paste comprising a resin (A) for pigment dispersion, cellulose (B), an extender pigment (C), and water, wherein the extender pigment (C) has a zeta potential within a range of −10 mV to +50 mV, and the pigment dispersion paste contains the cellulose (B) and the extender pigment (C) at proportions of 0.1 to 25 parts by mass and 80 to 800 parts by mass, respectively, per 100 parts by mass of the resin (A) for pigment dispersion in terms of solid content (claim 1). Patent Literature 1 describes that by virtue of inclusion of this pigment dispersion paste, defects such as cratering and seeding will be less likely to occur when an electrodeposition coating material is used after stirring, circulation, etc. are stopped for a long period of time.

CITATIONS LIST

Patent Literature

Patent Literature 1: JP-A-2012-092293

SUMMARY OF THE INVENTION

Technical Problems

The invention described in Patent Literature 1 is an invention that attempts to prevent the occurrence of cratering by using the specific extender pigment (C). On the other hand, when a specific pigment is contained as an essential component, the design range of the color tone, coating film properties and the like of the electrodeposition coating composition may be limited. In recent years, a higher level of cratering prevention performance tends to be required. An object of the present invention is to solve the above technical problems, and the challenge is to provide an electrodeposition coating composition having a higher level of cratering prevention performance.

Solutions to Problems

In order to solve the above-described problems, the present invention provides the following embodiments.

[1]
A cationic electrodeposition coating composition comprising a coating film-forming resin (A), a metal compound (B) containing a trivalent metal element, and a silicone compound (C), wherein
a content of the metal compound (B) is 0.03 parts by mass or more and less than 4 parts by mass in terms of a metal element based on 100 parts by mass of a resin solid content of the coating film-forming resin (A), and
a content of the silicone compound (C) is 0.005 parts by mass or more and 4.5 parts by mass or less based on 100 parts by mass of the resin solid content of the coating film-forming resin (A).

[2]
The cationic electrodeposition coating composition according to [1], wherein the metal element contained in the metal compound (B) is one or more selected from the group consisting of Y, La, Ce, Nd, Pr, Yb, and Bi.

[3]
The cationic electrodeposition coating composition according to [1] or [2], wherein a SP value of the silicone compound (C) is more than 10.5 and 15.0 or less.

[4]
The cationic electrodeposition coating composition according to any one of [1] to [3], wherein the silicone compound (C) is at least one species selected from the group consisting of a polyether modified silicone compound (C-1), a polyester modified silicone compound (C-2), and a polyacrylic modified silicone compound (C-3).

[5]
The cationic electrodeposition coating composition according to any one of [1] to [4], wherein the silicone compound (C) is soluble or dispersible in an aqueous solvent.

[6]
A method for forming a cured electrodeposition coating film, the method comprising:
forming an uncured electrodeposition coating film by immersing an article to be coated in the cationic electrodeposition coating composition according to any one of [1] to [5] and performing electrodeposition coating; and
heating and curing the uncured electrodeposition coating film to form a cured electrodeposition coating film on the article.

Advantageous Effects of Invention

The cationic electrodeposition coating composition of the present invention has good anti-cratering performance. By using the cationic electrodeposition coating composition, a cured electrodeposition coating film having a good coating film appearance can be formed.

DESCRIPTION OF EMBODIMENTS

The cationic electrodeposition coating composition comprises a coating film-forming resin (A), a metal compound (B) containing a trivalent metal element, and a silicone compound (C). In the following, respective components are described.

Coating Film-Forming Resin (A)

The cationic electrodeposition coating composition comprises a coating film-forming resin (A). The coating film-forming resin (A) contained in the cationic electrodeposition coating composition preferably comprises a resin emulsion comprising an aminated resin and a curing agent.

Aminated Resin

The aminated resin is a coating film-forming resin for constituting an electrodeposition coating film. As the aminated resin, an amine-modified epoxy resin obtained by modifying an oxirane ring in a resin skeleton with an organic amine compound is preferable. Generally, an amine-modified epoxy resin is prepared by ring-opening an oxirane ring in a starting raw material resin molecule via a reaction with an amine such as a primary amine, secondary amine or tertiary amine and/or an acid salt thereof. Typical examples of the starting raw material resin include polyphenol polyglycidyl ether type epoxy resins, which are reaction products of polycyclic phenol compounds, such as bisphenol A, bisphenol F, bisphenol S, phenol novolac, cresol novolac or the like with epichlorohydrin. Examples of other starting raw material resins include the oxazolidone ring-containing epoxy resins disclosed in JP-A-5-306327. Such epoxy resins can be prepared via a reaction of a diisocyanate compound or a bisurethane compound obtained by blocking the isocyanate groups of a diisocyanate compound with a lower alcohol such as methanol, ethanol or the like with epichlorohydrin.

The starting raw material resin can be chain-extended with a bifunctional polyester polyol, a polyether polyol, a bisphenol, a dibasic carboxylic acid, or the like before a ring-opening reaction of an oxirane ring with an amine, and then used. By using, especially, a bisphenol before the ring-opening reaction of an oxirane ring with an amine, a chain may be extended.

Likewise, before a ring-opening reaction of an oxirane ring with an amine, to control a molecular weight or an amine equivalent, improve heat flowability and the like, some oxirane rings can have added a monohydroxy compound such as 2-ethylhexanol, nonylphenol, ethylene glycol mono-2-ethylhexyl ether, ethylene glycol mono-n-butyl ether, propylene glycol mono-2-ethylhexyl ether or the like, or a monocarboxylic acid compound such as octylic acid or the like to it.

Examples of an amine that can be used when ring-opening an oxirane ring and thereby introducing an amino group include a primary amine, secondary amine, or tertiary amine and/or an acid salt thereof, such as butylamine, octylamine, diethylamine, dibutylamine, methylbutylamine, monoethanolamine, diethanolamine, N-methylethanolamine, triethylamine, N,N-dimethylbenzylamine, N,N-dimethylethanolamine or the like. Moreover, a ketimine-blocked primary amino group-containing secondary amine such as aminoethylethanolamine methyl isobutyl ketimine or the like, and diethylene triamine diketimine can also be used. To open all oxirane rings, such amines need to be reacted by at least 1.0 equivalent for the oxirane rings.

The number-average molecular weight of the aminated resin is preferably 1,000 or more and 5,000 or less. The condition that the number-average molecular weight is 1,000 or more affords good physical properties of a resulting cured electrodeposition coating film such as solvent resistance, corrosion resistance or the like. On the other hand, the condition that the number-average molecular weight is 5,000 or less makes it easy to adjust the viscosity of the aminated resin and possible to perform smooth synthesis, and makes it easy to handle emulsification and dispersion of the resulting aminated resin. The number-average molecular weight of the aminated resin is more preferably within the range of 1,600 or more and 3,200 or less.

In the present description, the number-average molecular weight is a number-average molecular weight in terms of polystyrene as measured by gel permeation chromatography (GPC).

The amine value of the aminated resin is preferably within the range of 20 mg KOH/g or more and 100 mg KOH/g or less. The condition that the amine value of the aminated resin is 20 mg KOH/g or more leads to good emulsification-dispersion stability of the aminated resin in an electrodeposition coating composition. On the other hand, the condition that the amine value is 100 mg KOH/g or less leads to a proper amount of amino groups in a cured electrodeposition coating film and can control a lowering the water resistance of a coating film. The amine value of the aminated resin is more preferably within the range of 20 mg KOH/g or more and 80 mg KOH/g or less.

The hydroxyl value of the aminated resin is preferably within the range of 50 mg KOH/g or more and 400 mg KOH/g mg KOH/g or less. The condition that the hydroxyl value is 50 mg KOH/g or more leads to good curing of a cured electrodeposition coating film. On the other hand, the condition that the hydroxyl value is 400 mg KOH/g or less leads to a proper amount of hydroxyl groups remaining in a cured electrodeposition coating film and can control a lowering the water resistance of a coating film. The hydroxyl value of the aminated resin is more preferably within the range of 100 mg KOH/g or more and 300 mg KOH/g or less.

In the electrodeposition coating composition of the present invention, use of an aminated resin having a number-average molecular weight 1,000 or more and 5,000 or less, an amine value of 20 mg KOH/g or more and 100 mg KOH/g or less, and a hydroxyl value of 50 mg KOH/g or more and 400 mg KOH/g or more, affords an advantage that superior corrosion resistance can thereby be imparted to an article to be coated.

As the aminated resin, aminated resins differing in amine value and/or hydroxyl value may optionally be used in combination. When two or more aminated resins differing in amine value and hydroxyl value are used in combination, the average amine value and the average hydroxyl value calculated on the basis of the mass ratio of the aminated resins to be used are preferably within the above-mentioned numerical values. As the aminated resin to be used in combination, preferred are an aminated resin having an amine value of 20 mg KOH/g or more and 50 mg KOH/g or less and a hydroxyl value of 50 mg KOH/g or more and 300 mg KOH/g or less and an aminated resin having an amine value of 50 mg KOH/g or more and 200 mg KOH/g or less and a hydroxyl value of 200 mg KOH/g or more and 500 mg KOH/g or less.

Use of such a combination affords an advantage that superior corrosion resistance can thereby be imparted because the core part of an emulsion is thereby made more hydrophobic and the shell part of the emulsion is made more hydrophilic.

The aminated resin may optionally contain an amino group-containing acrylic resin, an amino group-containing polyester resin, or the like.

Curing Agent

The resin emulsion comprises a curing agent. As the curing agent, a blocked isocyanate curing agent is suitably used. The blocked isocyanate curing agent can be prepared by blocking a polyisocyanate with a blocking agent.

Examples of the polyisocyanate include aliphatic diisocyanates such as hexamethylene diisocyanate (including a trimer), tetramethylene diisocyanate, trimethylhexamethylene diisocyanate or the like; cycloaliphatic polyisocianates such as isophorone diisocyanate, 4,4'-methylene-bis-(cyclohexyl isocyanate) or the like; and aromatic diisocyanates such as 4,4'-diphenylmethane diisocyanate, tolylene diisocyanate, xylylene diisocyanate or the like; modified products of these diisocyanates (urethanized materials, materials modified with carbodiimide, uretdione, uretonimine, biuret and/or isocyanurate).

Examples of the blocking agent that may preferably be used include monohydric alkyl (or aromatic) alcohols such as n-butanol, n-hexyl alcohol, 2-ethylhexanol, lauryl alcohol, phenol carbinol, methylphenyl carbinol or the like; cellosolves such as ethylene glycol monohexyl ether, ethylene glycol mono-2-ethylhexyl ether or the like; polyether-type both-ends diols such as polyethylene glycol, polypropylene glycol, polytetramethylene ether glycol phenol or the like; polyester-type both-ends polyols obtained from a diol such as ethylene glycol, propylene glycol, 1,4-butanediol or the like and a dicarboxylic acid such as oxalic acid, succinic acid, adipic acid, suberic acid, sebacic acid or the like; phenols such as para-t-butylphenol, cresol or the like; oximes such as dimethyl ketoxime, methyl ethyl ketoxime, methyl isobutyl ketoxime, methyl amyl ketoxime, cyclohexanone oxime or the like; and lactams typified by ε-caprolactam and γ-butyrolactam.

The blocking ratio of the blocked isocyanate curing agent is preferably 100%. This affords an advantage that the storage stability of the electrodeposition coating composition is improved.

As the blocked isocyanate curing agent, a curing agent prepared by blocking an aliphatic diisocyanate with a blocking agent and a curing agent prepared by blocking an aromatic diisocyanate with a blocking agent are preferably be used in combination.

The blocked isocyanate curing agent preferentially reacts with the primary amine of the aminated resin, and further reacts with a hydroxyl group to be cured. As the curing agent, at least one curing agent selected from the group consisting of organic curing agents such as melamine resin or phenol resin or the like, silane coupling agents, and metal curing agents may be used in combination with the blocked isocyanate curing agent.

Preparation of Resin Emulsion

The resin emulsion can be prepared by dissolving each of the aminated resin and the blocked isocyanate curing agent in an organic solvent to prepare a solution, mixing these solutions together, and then performing neutralization with a neutralizing acid. Examples of the neutralizing acid include organic acids such as methanesulfonic acid, sulfamic acid, lactic acid, dimethylol propionic acid, formic acid, acetic acid or the like. In the present invention, it is more preferable to neutralize the resin emulsion containing the aminated resin and the curing agent with one or more acids selected from the group consisting of formic acid, acetic acid, and lactic acid.

The content of the curing agent is required be an amount sufficient for reacting with a primary amino group, a secondary amino group, or an active hydrogen-containing functional group such as a hydroxyl group or the like in the aminated resin during curing to afford a good cured coating film. A preferred content of the curing agent is within the range of from 90/10 to 50/50, more preferably from 80/20 to 65/35, in terms of the solid mass ratio of the aminated resin to the curing agent (aminated resin/curing agent). By adjusting the solid mass ratio of the aminated resin and the curing agent, the fluidity and the curing rate of the coating film (deposited film) at the time of film formation are improved, and the coating film appearance is improved.

The solid content of the resin emulsion is usually 25% by mass or more and 50% by mass or more, preferably 35% by mass or more and 45% by mass or less, based on the total amount of the resin emulsion. Here, the term "the solid content of a resin emulsion" means the mass of all components that are contained in the resin emulsion and remain in a solid form even after the removal of a solvent. Specifically, it means the total of the mass of the aminated resin, the curing agent, and other solid components optionally added, which are contained in the resin emulsion.

The neutralizing acid is preferably used in an amount of 10% or more and 100% or less, is more preferably 20% or more and 70% or less, in the equivalent ratio of the neutralizing acid to the equivalent of the amino groups of the aminated resin. In this description, the equivalent ratio of the neutralizing acid to the equivalent of the amino groups of the aminated resin is taken as the neutralization ratio. When the neutralization ratio is 10% or more, the affinity to water is secured and the dispersibility in water is improved.

In one embodiment, when the coating film-forming resin (A) comprises a resin emulsion comprising an aminated resin and a curing agent, 100 parts by mass of the resin solid content of the coating film-forming resin means that the total of the resin solid contents thereof is 100 parts by mass. Besides this example, when the coating film-forming resin (A) contains a plurality of types of resin, 100 parts by mass of the resin solid content contained in the coating film-forming resin (A) means that the total of the solid contents of the plurality of types of resin is 100 parts by mass.

Examples of such other coating film-forming resin components which the coating film-forming resin (A) may contain include acrylic resins, polyester resins, urethane resins, butadiene resins, phenol resins, xylene resins or the like.

Metal Compound (B) Containing Trivalent Metal Element

The cationic electrodeposition coating composition comprises a metal compound (B) containing a trivalent metal element. The "trivalent metal element" in the present description means a metal element that becomes a trivalent cation. Examples of the trivalent metal element include Y, La, Ce, Nd, Pr, Yb, and Bi. These may be used singly or two or more of them may be used in combination. Examples of the form of the metal compound include metal oxides, metal hydroxides or the like.

The metal element contained in the metal compound (B) is preferably one or more selected from the group consisting of Y, La, Ce, Nd, and Bi.

The inclusion of the metal compound (B) in the cationic electrodeposition coating composition has an advantage that good rust prevention property, curability and the like can be obtained. Furthermore, the use of the metal compound (B)

and the silicone compound (C) in combination in the cationic electrodeposition coating composition has an advantage that good cratering prevention performance is achieved.

For example, when a bismuth compound is contained as the metal compound (B), good curability performance can be imparted to the cationic electrodeposition coating composition. Inclusion of the bismuth compound in the cationic electrodeposition coating composition makes it unnecessary to use a lead compound, an organotin compound, or the like as a curing catalyst. Thus, an electrodeposition coating composition substantially containing neither a tin compound nor a lead compound can be prepared.

The content of the metal compound (B) is an amount of 0.03 parts by mass or more and less than 4 parts by mass in terms of a metal element based on 100 parts by mass of the resin solid content contained in the cationic electrodeposition coating composition. When the content of the metal compound (B) is less than 0.03 parts by mass, the balance between the coating film appearance and the cratering prevention performance of the resulting cured electrodeposition coating film may be lost. When the content of the metal compound (B) is 4 parts by mass or more, the coating film appearance of the resulting cured electrodeposition coating film may be poor. The content of the metal compound (B) is preferably 0.04 parts by mass or more and 3.8 parts by mass or less, and more preferably 0.05 parts by mass or more and 3.5 parts by mass or less.

Silicone Compound (C)

The cationic electrodeposition coating composition comprises a silicone compound (C). The SP value of the silicone compound (C) is preferably more than 10.5 and 15.0 or less.

The cationic electrodeposition coating composition comprises both the metal compound (B) and the silicone compound (C) within specific content ranges. Because of this, for example, the electrodeposition coating composition can exhibit good anti-cratering property even when the mechanisms of the existence of oil are different as shown in the flowing oil cratering property evaluation and the oil contamination cratering property evaluation described below. Therefore, for example, it is possible to show good anti-cratering property even for oil derived from equipment used in drying and curing processes such as indirect furnaces and drying ovens, i.e., oil that may be contaminated in after coating and before curing. For example, the oil that may be contaminated in after coating and before curing may be contaminated in at a high temperature such as around the baking temperature. Furthermore, when an oil is contaminated in the coating composition, good anti-cratering property can be exhibited even when the coating film is formed under the condition that the oil can remain on an article to be coated.

In addition, the resulting electrodeposition coating film can exhibit good appearance, and, for example, it is possible to suppress the generation of seeds (impurities like small projections). It can also have a uniform coating film surface and have good coating film appearance such as no coating unevenness.

The SP value of the silicone compound (C) is preferably more than 10.5 and 15.0 or less. The SP value is more preferably 11.0 or more and 15.0 or less, and even more preferably 12.0 or more and 15.0 or less. The SP value is particularly preferably 12.3 or more and less than 15.0, and even particularly preferably 12.5 or more and less than 15.0.

When the SP value of the silicone compound (C) is within such a range, there is an advantage that the appearance of the resulting coating film is not impaired and good anti-cratering property is obtained even under various conditions of the oil contamination route. Furthermore, for example, good adhesion can be exhibited with a topcoat coating film or the like. In addition, when the SP value of the silicone compound (C) is within such a range, there is an advantage that the cratering prevention performance can be satisfactorily secured and good coating material stability can be obtained. Although it should not be construed as being limited to a particular theory, it is considered that the SP value of the silicone compound (C) is within such a range, so that good anti-cratering property and high quality appearance can be achieved without impairing coating material stability.

The SP value is an abbreviation of solubility parameter and is a measure of solubility. The larger the SP value, the higher the polarity, while the smaller the value thereof, the lower the polarity.

For example, the SP value can be measured by the following method [reference: SUH, CLARKE, J.P.S.A-1, 5, 1671-1681 (1967)].

As a sample, a mixture prepared by weighing 0.5 g of an organic solvent in a 100 ml beaker, adding 10 ml of acetone with a whole pipette, and dissolving them with a magnetic stirrer is used. A poor solvent is dropped into this sample using a 50 ml burette at a measurement temperature of 20° C., and the point at which turbidity is generated is defined as a dropping amount. As to the poor solvent, ion-exchanged water is used as a high SP poor solvent, whereas n-hexane is used as a low SP poor solvent, and the clouding point of each of the solvents is measured. The SP value $\delta$ of an organic solvent is given by the following calculation formula.

$$\delta = (V_{ml}^{1/2}\delta_{ml} + V_{mh}^{1/2}\delta_{mh})/(V_{ml}^{1/2}V_{mh}^{1/2})$$

$$V_m = V_1 V_2/(\varphi_1 V_2 + \varphi_2 V_1)$$

$$\delta_m = \varphi_1 \delta_1 + \varphi_2 \delta_2$$

Vi: the molecular volume of the solvent (ml/mol)
φi: the volume fraction of each solvent at the clouding point
δi: the SP value of the solvent
ml: low SP poor solvent mixed system
mh: high SP poor solvent mixed system When the silicone compound (C) contains a plurality of types of silicone compound (C), the SP value of the silicone compound (C) can be determined by calculating an average value using the SP values of the respective compounds based on the solid mass ratio in the silicone compound (C) component.

The cationic electrodeposition coating composition contains the silicone compound (C) in an amount of 0.005 parts by mass or more and 4.5 parts by mass or less based on 100 parts by mass of the resin solid content of the coating film-forming resin (A). The content of the silicone compound (C) is preferably 0.006 parts by mass or more and 4.0 parts by mass or less, and more preferably 0.008 parts by mass or more and 3.8 parts by mass or less.

When the amount of the silicone compound (C) is within such a range, the appearance of the resulting coating film is not impaired, and the coating film has good anti-cratering property against various cratering differing in mechanism that may be exhibited in evaluation of oil contamination cratering, evaluation of flowing oil cratering, etc. Further, there is an advantage that good adhesion can be exhibited with various coating films such as a topcoat coating film or the like.

Advantageously, the silicone compound (C) having the prescribed SP value mentioned above can stably exist in an aqueous system, is soluble or dispersible in an aqueous solvent, and can be easily dispersed by itself in water. In the present description, that the silicone compound (C) is soluble or dispersible in an aqueous solvent means that the silicone compound (C) according to the present disclosure can be easily dissolved or uniformly dispersed when being mixed in a prescribed amount with an aqueous solvent at normal temperature. Further, that the silicone compound (C) is easily dispersed by itself in water means that the silicone compound (C) can be uniformly dispersed in an aqueous solvent at normal temperature without using a dispersant, a surfactant, or the like.

By virtue of the fact that the silicone compound (C) has such properties, good coating material stability is exhibited, for example, stability in an aqueous system is exhibited. Moreover, since the silicone compound (C) can be dispersed in an aqueous solvent without being diluted with a solvent during the production of the cationic coating composition, the load on the environment can be reduced.

In one embodiment, the silicone compound (C) has polysiloxane as a main skeleton. For example, the polysiloxane has 3 or more and 20 or less Si atoms, for example, 3 or more and 10 or less Si atoms, in the molecule. In one embodiment, the silicone compound (C) has polydimethylsiloxane as a main skeleton.

In one embodiment, the silicone compound (C) is at least one species selected from the group consisting of a polyether modified silicone compound (C-1), a polyester modified silicone compound (C-2), and a polyacrylic modified silicone compound (C-3). The cationic electrodeposition coating composition of the present disclosure may contain these modified silicone compounds singly or in combination.

By containing such a silicone compound (C), the cationic electrodeposition coating composition of the present disclosure can have both better anti-cratering property and better coating film appearance, and can exhibit better coating material stability.

In one embodiment, the silicone compound (C) is at least one selected from the group consisting of a polyether modified silicone compound (C-1), a polyester modified silicone compound (C-2), and a polyacrylic modified silicone compound (C-3).

The silicone compound (C) can have more stable wettability by containing such a combination.

Furthermore, the cationic electrodeposition coating composition of the present disclosure having such a silicone compound (C) can have superior anti-cratering property. It can also exhibit better stability of the coating material. Further, there is an advantage that adhesion between an electrodeposition coating film formed from a cationic electrodeposition coating composition and a topcoat coating film or the like is improved.

Examples of the polyether modified silicone compound (C-1) include compounds in which a polyether chain is introduced into terminals and/or side chains of polysiloxane. For example, the polysiloxane may further have a substituent other than the polyether chain.

In one embodiment, the polyether modified silicone compound (C-1) is a compound in which a polyether chain is introduced into side chains of polysiloxane such as polydimethylsiloxane.

By containing the polyether modified silicone compound (C-1), the cationic electrodeposition coating composition of the present disclosure has such effects as better anti-cratering property and better coating film appearance, for example, good coating film smoothness and no coating unevenness. It can also exhibit better stability of the coating material. Further, there is an advantage that adhesion between an electrodeposition coating film formed from a cationic electrodeposition coating composition and a topcoat coating film or the like is improved.

Examples of the polyester modified silicone compound (C-2) include compounds in which a polyester chain is introduced into terminals and/or side chains of polysiloxane. For example, the polysiloxane may further have a substituent other than the polyester chain.

In one embodiment, the polyester modified silicone compound (C-2) is a compound in which a polyester chain is introduced into side chains of polysiloxane such as polydimethylsiloxane.

By containing the polyester modified silicone compound (C-2), the cationic electrodeposition coating composition of the present disclosure has better anti-cratering property and better coating film appearance. It can also exhibit better stability of the coating material. Further, there is an advantage that adhesion between an electrodeposition coating film formed from a cationic electrodeposition coating composition and a topcoat coating film or the like is improved.

Examples of the polyacrylic modified silicone compound (C-3) include compounds in which a polyacrylic chain is introduced into terminals and/or side chains of polysiloxane. For example, the polysiloxane may further have a substituent other than the polyacrylic chain.

In one embodiment, the polyacrylic modified silicone compound (C-3) is a compound in which a polyacrylic chain is introduced into side chains of polysiloxane such as polydimethylsiloxane.

By containing the polyacrylic modified silicone compound (C-3), the cationic electrodeposition coating composition of the present disclosure has such effects as better anti-cratering property and better coating film appearance. It can also exhibit better stability of the coating material. Further, there is an advantage that adhesion between an electrodeposition coating film formed from a cationic electrodeposition coating composition and a topcoat coating film or the like is improved.

Pigment and Pigment Dispersion Paste

The cationic electrodeposition coating composition may comprise a pigment in addition to the components described above. When the cationic electrodeposition coating composition contains a pigment, it is preferable to prepare a pigment dispersion paste using the pigment and a pigment dispersant in the preparation of the electrodeposition coating composition. The pigment dispersion paste can be prepared by a method known to those skilled in the art.

In the preparation of the pigment dispersion paste, it is preferable to disperse the metal compound (B). As Embodiment Example of the preparation of such a pigment dispersion paste include the following Embodiments 1 to 3.

Embodiment 1

The pigment dispersion paste comprises a metal compound (B), a pigment dispersion resin, and a pigment, wherein the pigment dispersion paste is prepared through a step of mixing the metal compound (B) with the pigment dispersion resin, and mixing the resulting mixture with the pigment dispersion resin and the pigment.

Embodiment 2

The pigment dispersion paste comprises a metal compound (B), a pigment dispersion resin, a capping agent, and a pigment, and the capping agent comprises one or more species selected from the group consisting of an amine-modified epoxy resin having a hydroxyl value of 150 mg KOH/g or more and 650 mg KOH/g or less and an amine value of 30 mg KOH/g or more and 190 mg KOH/g or less and a polyvalent acid, and the pigment dispersion paste is prepared through a step of mixing the metal compound (B) with the pigment dispersion resin and the capping agent, and mixing the resulting mixture with the pigment dispersion resin and the pigment.

Embodiment 3

The pigment dispersion paste comprises a metal compound (B), a pigment dispersion resin, an organic acid, a capping agent, and a pigment, wherein the organic acid is one or more compounds selected from the group consisting of hydroxymonocarboxylic acids and sulfonic acids, the capping agent comprises one or more species selected from the group consisting of an amine-modified epoxy resin having a hydroxyl value of 150 mg KOH/g or more and 650 mg KOH/g or less and an amine value of 30 mg KOH/g or more and 190 mg KOH/g or less and a polyvalent acid, and the pigment dispersion paste is prepared through a step of mixing the metal compound (B) with the organic acid, mixing the resulting mixture with the pigment dispersion resin and the capping agent, and then mixing the resulting mixture with the pigment.

Hereinafter, each component contained in the pigment dispersion paste will be described in detail.

Pigment Dispersion Resin

The pigment dispersion resin is a resin for dispersing a pigment, and it is dispersed in an aqueous medium and then used. As the pigment dispersion resin, there can be used a pigment dispersion resin having a cationic group, such as a modified epoxy resin or the like having at least one selected from the group consisting of a quaternary ammonium group, a tertiary sulfonium group, and a primary amine group. As the aqueous solvent, ion-exchanged water, water containing a small amount of alcohol or the like is used.

As the pigment dispersion resin, an amine-modified epoxy resin having a hydroxyl value of 20 mg KOH/g or more and 120 mg KOH/g or less is preferably used. The amine-modified epoxy resin having a hydroxyl value of 20 mg KOH/g or more and 120 mg KOH/g or less can be prepared, for example, by reacting a half-blocked isocyanate with a hydroxyl group of an epoxy resin having a hydroxyl group to introduce a blocked isocyanate group.

Generally, a polyepoxide is used as the epoxy resin. This epoxide has two or more 1,2-epoxy groups on average in one molecule. Useful examples of such polyepoxides include the epoxy resins described above.

The half-blocked isocyanate to be used to react with the epoxy resin is prepared by partially blocking a polyisocyanate. The reaction between the polyisocyanate and the blocking agent is preferably carried out by cooling the reactants to 40° C. or more and 50° C. or less while adding the blocking agent dropwise under stirring in the presence of a curing catalyst (e.g., a tin-based catalyst or the like) as necessary.

The polyisocyanate is not particularly limited as long as it has two or more isocyanate groups on average in one molecule. As a specific example, a polyisocyanate that can be used in the preparation of the blocked isocyanate curing agent can be used.

Examples of suitable blocking agents for preparing the half-blocked isocyanate include lower aliphatic alkyl monoalcohols having 4 or more and 20 or less carbon atoms. Specific examples thereof include butyl alcohol, amyl alcohol, hexyl alcohol, 2-ethylhexyl alcohol, heptyl alcohol or the like.

The reaction of the epoxy resin with the half-blocked isocyanate is preferably carried out by keeping the reactants at 140° C. for about 1 hour.

As the tertiary amine, one having 1 or more and 6 or less carbon atoms can be preferably used. Specific examples of the tertiary amine include dimethylethanolamine, trimethylamine, triethylamine, dimethylbenzylamine, diethylbenzylamine, N,N-dimethylcyclohexylamine, tri-n-butylamine, diphenethylmethylamine, dimethylaniline and N-methylmorpholine.

Furthermore, the neutralizing acid to be used in mixture with the tertiary amine is not particularly limited, and specific examples thereof include inorganic acids or organic acids such as hydrochloric acid, nitric acid, phosphoric acid, formic acid, acetic acid and lactic acid. The neutralizing acid is more preferably one or more acids selected from the group consisting of formic acid, acetic acid and lactic acid. The reaction of the thus-obtained neutralizing acid salt of a tertiary amine with the epoxy resin can be carried out by a conventional method. For example, the reaction can be performed by dissolving the epoxy resin in a solvent such as ethylene glycol monobutyl ether or the like, heating the resulting solution to a temperature of 60° C. or more and 100° C. or less, adding a neutralizing acid salt of a tertiary amine dropwise thereto, and holding the reaction mixture at a temperature of 60° C. or more and 100° C. or less until the acid value reaches 1.

The amine-modified epoxy resin having a hydroxyl value of 20 mg KOH/g or more and 120 mg KOH/g or less preferably has an epoxy equivalent of 1000 or more and 1800 or less. The epoxy equivalent is more preferably 1200 or more and 1700 or less. The amine-modified epoxy resin having a hydroxyl value of 20 mg KOH/g or more and 120 mg KOH/g or less preferably has a number-average molecular weight of 1500 or more and 2700 or less.

The amine-modified epoxy resin having a hydroxyl value of 20 mg KOH/g or more and 120 mg KOH/g or less preferably has a quaternary ammonium group in an amount of 35 mEq (milligram equivalent) or more and 70 mEq or less per 100 g, and more preferably has a quaternary ammonium group in an amount of 35 mEq or more and 55 mEq or less per 100 g. When the amount of the quaternary ammonium group is within the above range, there are advantages that pigment dispersion performance is improved and the coating workability of the electrodeposition coating composition is improved.

The amount of the pigment dispersion resin, which is represented by the ratio (solid mass ratio) of the pigment and the pigment dispersion resin contained in the pigment dispersion paste, is preferably within the range of pigment/pigment dispersion resin=1/0.1 to 1/1.5, and more preferably within the range of pigment/pigment dispersion resin=1/0.1 to 1/1.1.

Pigment

As the pigment, a pigment commonly used for electrodeposition coating compositions can be used. Examples of the pigment include inorganic pigments and organic pigments which are usually used, for example, coloring pigments such as titanium white (titanium dioxide), carbon black, and red iron oxide; extender pigments such as kaolin, talc, aluminum silicate, calcium carbonate, mica, and clay; and antirust pigments such as iron phosphate, aluminum phosphate, calcium phosphate, aluminum tripolyphosphate, aluminum phosphomolybdate, aluminum zinc phosphomolybdate or the like.

The pigment is preferably used in an amount of 1% by mass or more and 30% by mass or less with respect to the resin solid content of the cationic electrodeposition coating composition.

Organic Acid

In the present invention, it is more preferable to use an organic acid in the preparation of the pigment dispersion paste. When an organic acid is used in the present invention, the metal compound (B) and the organic acid are mixed together in advance to prepare a mixture. Mixing the metal compound (B) and the organic acid in advance affords an advantage that the solubility and the dispersibility of the metal compound (B) are improved, whereby the catalytic activity is improved and a coating film superior in curability and corrosion resistance can be formed.

As the organic acid is, for example, one or more compounds selected from the group consisting of hydroxymonocarboxylic acids and sulfonic acids.

Examples of the hydroxycarboxylic acid include the following compounds:

a) monohydroxymonocarboxylic acids, particularly aliphatic monohydroxymonocarboxylic acids, having a total number of carbon atoms of 2 or more and 5 or less, preferably 2 or more and 4 or less, such as lactic acid, glycolic acid or the like;

b) dihydroxymonocarboxylic acids, particularly aliphatic dihydroxymonocarboxylic acids, having a total number of carbon atoms of 3 or more and 7 or less, preferably 3 or more and 6 or less, such as dimethylolpropionic acid (DMPA), glyceric acid or the like.

The sulfonic acids are organic sulfonic acids, and examples thereof include alkanesulfonic acids having a total number of carbon atoms of 1 or more and 5 or less, preferably 1 or more and 3 or less, such as methanesulfonic acid, ethanesulfonic acid or the like.

As the organic acid, one or more acids selected from the group consisting of lactic acid, dimethylolpropionic acid, and methanesulfonic acid are even more preferably used.

The form of use of the organic acid is not particularly limited, and examples thereof include a solid form, a liquid form, and a solution form with the organic acid dissolved in a solvent (especially, an aqueous solution form). The organic acid is preferably used in the form of an aqueous solution. Examples of a solvent that can be used for the preparation of an aqueous solution of an organic acid include water such as ion-exchanged water, purified water and distilled water, and an aqueous solvent containing water as a main component. The aqueous solvent may contain an optional organic solvent (e.g., a water-soluble or water-miscible organic solvent such as alcohols, esters, ketones or the like) in addition to water.

In the present invention, when an organic acid is used, the ratio of the number of moles of metal in the metal compound (B) and the number of moles of the organic acid is more preferably within the range of metal compound (B):organic acid=1:0.3 to 1:2.7. The metal element contained in the metal compound (B) in the present invention is one or more metal elements selected from the group consisting of Y, La, Ce, Nd, Pr, and Bi, which are all elements to become trivalent cations. One or more compounds selected from the group consisting of hydroxymonocarboxylic acids and sulfonic acids, which are the organic acids, are all monovalent acids. Therefore, the case where the ratio of the number of moles of metal element and the number of moles of an organic acid is within the range of metal element:organic acid=1:0.3 to 1:2.7 is a state where the total valence of anions derived from the organic acid (the number of moles of the organic acid) is less than the total valence of cations derived from metal element (that is, the number of moles of the metal element×3). By using the metal compound (B) and the organic acid at the above ratio, it is possible to prepare an electrodeposition coating composition that provides a cured coating film having superior coating film appearance.

In a preferred embodiment of the present invention, when the pigment dispersion paste contains the metal compound (B) and the organic acid in the above molar ratio, there is an advantage that better cratering prevention performance can be obtained without deteriorating the coating film appearance of the resulting cured electrodeposition coating film. Details of this mechanism are not necessarily clear, and are not bound by a theory, but it is considered that the conductivity of the electrodeposition coating composition is maintained within an appropriate range even when the metal compound (B) and the organic acid are contained in the electrodeposition coating composition by virtue of a state in which the total valence of anions by the organic acid (the number of moles of the organic acid) is less than the total valence of cations by the metal element (that is, the number of moles of the metal element×3).

The ratio of the numbers of moles is more preferably within the range of metal compound (B):organic acid=1:0.5 to 1:2.4, and even more preferably metal compound (B):organic acid=1:0.9 to 1:2.1.

Capping Agent

In one preferred embodiment of the present invention, a capping agent is used in the preparation of the pigment dispersion paste. The capping agent comprises one or more species selected from the group consisting of an amine-modified epoxy resin having a hydroxyl value of 150 mg KOH/g or more and 650 mg KOH/g or less and an amine value of 30 mg KOH/g or more and 190 mg KOH/g or less and a polyvalent acid. As the capping agent, either of them may be used, or both of them may be used in combination.

Amine-Modified Epoxy Resin

The amine-modified epoxy resin having a hydroxyl value of 150 mg KOH/g or more and 650 mg KOH/g or less and an amine value of 30 mg KOH/g or more and 190 mg KOH/g or less can be prepared by reacting an amine compound with an oxirane ring in the epoxy resin skeleton to modify the epoxy resin. The amine-modified epoxy resin can be prepared in the same manner as the amine-modified epoxy resin of the aminated resin described above. As the above amine-modified epoxy resin, the amine-modified epoxy resin in the aminated resin may be used as it is. In the present invention, either the same resin or different resins may be used as the amine-modified epoxy resins and the amine-modified epoxy resin of the aminated resin.

In the preparation of the amine-modified epoxy resin having a hydroxyl value of 150 mg KOH/g or more and 650 mg KOH/g or less and an amine value of 30 mg KOH/g or more and 190 mg KOH/g or less, the amine to be reacted with the oxirane ring of the epoxy resin preferably includes 50% by mass or more and 95% by mass or less of a secondary amine, 0% by mass or more and 30% by mass or less of a secondary amine having a blocked primary amine, and 0% by mass or more and 20% by mass or less of a primary amine.

In the amine-modified epoxy resin, when the hydroxyl value is 150 mg KOH/g or more and 650 mg KOH/g or less and the amine value is 30 mg KOH/g or more and 190 mg KOH/g or less, there is an advantage that capping performance is favorably exhibited, the dispersion stability of the resulting pigment dispersion paste is improved, and an electrodeposition coating composition superior in coating material stability is obtained.

The amine-modified epoxy resin having a hydroxyl value of 150 mg KOH/g or more and 650 mg KOH/g or less and an amine value of 30 mg KOH/g or more and 190 mg KOH/g or less preferably has a number-average molecular weight within the range of 1,000 or more and 5,000 or less. When the number-average molecular weight is within the above range, good pigment dispersion stability can be obtained. The number-average molecular weight of the amine-modified epoxy resin is even more preferably within the range of 2,000 or more and 3,500 or less. By virtue of the condition that the number-average molecular weight of the amine-modified epoxy resin is 1,000 or more, the physical properties such as solvent resistance, corrosion resistance and the like of a resulting cured electrodeposition coating film will be good. In addition, by virtue of the condition that the number-average molecular weight of the amine-modified epoxy resin is 5,000 or less, the dispersibility and the dispersion stability of the resulting pigment dispersion paste will be good.

In the amine-modified epoxy resin having a hydroxyl value of 150 mg KOH/g or more and 650 mg KOH/g or less and an amine value of 30 mg KOH/g or more and 190 mg KOH/g or less, the milligram equivalent (mEq(B)) of the base per 100 g of the resin solid content is preferably 50 to 350. When the mEq(B) of the amine-modified epoxy resin is within the above range, there is an advantage that good storage stability of the pigment dispersion paste can be secured. The milligram equivalent (mEq(B)) of the base per 100 g of the solid content of the amine-modified epoxy resin can be adjusted by the type and the amount of the amine compound to be reacted in the preparation of the amine-modified epoxy resin.

Herein, mEq(B) is an abbreviation of mg Equivalent (base), and is the milligram equivalent of the base per 100 g of the solid content of the resin. The mEq(B) can be measured by precisely weighing about 10 g of the solid content of the electrodeposition coating composition, dissolving the solid content in about 50 ml of a solvent (THF: tetrahydrofuran), then adding 7.5 ml of acetic anhydride and 2.5 ml of acetic acid, and performing potentiometric titration with a 0.1 N perchloric acid solution in acetic acid using an automatic potentiometric titrator (e.g., APB-410 manufactured by Kyoto Electronics Manufacturing Co., Ltd., etc.) to quantify the amount of the base contained in the amine-modified epoxy resin.

In the present invention, when an amine-modified epoxy resin having a hydroxyl value of 150 mg KOH/g or more and 650 mg KOH/g or less and an amine value of 30 mg KOH/g or more and 190 mg KOH/g or less is used, it is preferably prepared into a resin emulsion state and then used. One embodiment of the method for preparing a resin emulsion may be a method of preparing the resin emulsion in the same manner as the resin emulsion that can be used as the coating film-forming resin (A). Specifically, an amine-modified epoxy resin emulsion can be prepared by dissolving each of the amine-modified epoxy resin and the blocked isocyanate curing agent in an organic solvent to prepare solutions, mixing these solutions, and then dispersing the mixture in water using a neutralizing acid. As another possible embodiment of the method for preparing the amine-modified epoxy resin emulsion, the amine-modified epoxy resin is dissolved in an organic solvent to prepare a solution, and the solution is then dispersed in water using a neutralizing acid.

Examples of the neutralizing acid that can be used for the preparation of the resin emulsion include organic acids such as methanesulfonic acid, sulfamic acid, lactic acid, dimethylolpropionic acid, formic acid, acetic acid or the like. As the neutralizing acid, it is more preferable to use one or more acids selected from the group consisting of formic acid, acetic acid, and lactic acid.

When the amine-modified epoxy resin is used as the capping agent, the amount of the amine-modified epoxy resin contained in the pigment dispersion paste is preferably 0.02 parts by mass or more and 3 parts by mass or less, more preferably 0.03 parts by mass or more and 1 part by mass or less, and even more preferably 0.06 parts by mass or more and 0.4 parts by mass or less in terms of the resin solid content of the amine-modified epoxy resin based on 100 parts by mass of the resin solid content of the pigment dispersion resin. When the amount of the amine-modified epoxy resin is within the above range, there is an advantage that the effect as a capping agent and curability can be secured.

Polyvalent Acid

In the present description, the "polyvalent acid" refers to a compound having two or more monovalent acid groups or a compound having a divalent or higher valent acid group. The polyvalent acid is preferably one or more compounds selected from the group consisting of compounds having two or more carboxylic acid groups and compounds having a phosphoric acid group. Specific examples of the polyvalent acid include:

compounds having 2 or more 6 or less carbon atoms and having two or more carboxylic acid groups, such as tartaric acid, glutamic acid, citric acid, malic acid, hydroxymalonic acid, malonic acid, succinic acid, glutaric acid, adipic acid or the like;

polymers having two or more carboxylic acid groups, such as polyacrylic acid or the like; and compounds having a phosphoric acid group, such as phosphoric acid, condensed phosphoric acid (e.g. diphosphoric acid, triphosphoric acid, polyphosphoric acid and cyclophosphoric acid etc.) or the like.

In the present description, the condensed phosphoric acid means an inorganic compound having two or more phosphoric acid groups. The condensed phosphoric acid can be prepared, for example, by a dehydration reaction of orthophosphoric acid ($H_3PO_4$) or a reaction similar thereto.

The polyvalent acid is preferably one or more acids selected from the group consisting of tartaric acid, citric acid, phosphoric acid, condensed phosphoric acid, malic acid and polyacrylic acid, even more preferably one or more acids selected from the group consisting of tartaric acid, citric acid and malic acid.

The amount of the polyvalent acid contained in the pigment dispersion paste is preferably 0.01 parts by mass or more and 10 parts by mass or less, more preferably 0.08 parts by mass or more and 5 parts by mass or less, and even more preferably 0.09 parts by mass or more and 3.5 parts by mass or less based on 100 parts by mass of the resin solid content of the pigment dispersion resin.

In one preferred embodiment of the present invention, a capping agent comprising one or more species selected from the group consisting of an amine-modified epoxy resin having a hydroxyl value of 150 mg KOH/g or more and 650 mg KOH/g or less and an amine value of 30 mg KOH/g or more and 190 mg KOH/g or less and a polyvalent acid is used. The pigment dispersion paste is prepared by mixing a mixture obtained by mixing the metal compound (B) and the organic acid together, with the pigment dispersion resin and the capping agent, and then mixing the resulting mixture with the pigment. Thereby, the dispersion stability of the resulting pigment dispersion paste is improved, and an electrodeposition coating composition superior in coating material stability is obtained. Details of this mechanism are not necessarily clear and are not bound by a theory, but are considered as follows.

It is considered that by virtue of mixing the metal compound (B) with the organic acid in advance, the metal compound (B) is in a finely dispersed state. Specifically, it is considered that a part of the metal compound (B) is dissolved in the organic acid, and another part of the metal compound (B) is dispersed (for example, chelate-like dispersion) together with the organic acid. Here, by mixing the obtained mixture with the pigment dispersion resin, at least a part of the metal component of the metal compound (B) is coated with the pigment dispersion resin, so that the dispersion stability of the metal compound (B) is slightly improved. However, it is considered that the coated state of the metal compound (B) at this stage is not sufficient. Therefore, when a pigment is added, the pigment and the metal compound (B) can react with each other to collapse the coated state. Therefore, it is considered that by using a capping agent together with the pigment dispersion resin, the pigment dispersion resin is self-aggregated, so that soft coating of the metal compound (B) with the pigment dispersion resin is strengthened. Since this self-aggregation force is strong, there is an advantage that good dispersion stability can be obtained by using a capping agent together with the pigment dispersion resin even if the amount of the pigment dispersion resin is reduced. That is, in the present description, the term "capping agent" means a component having an action of strengthening the coating performance of the pigment dispersion resin that coats at least a part of the metal compound (B).

Preparation of Pigment Dispersion Paste

The preparations of the above Embodiments 1 to 3 will be described one after another. In the Embodiment 1, the pigment dispersion paste is prepared through a step of mixing a mixture obtained by mixing the metal compound (B) with the pigment dispersion resin, with the pigment dispersion resin and the pigment.

In this embodiment, first, the metal compound (B) is mixed with the pigment dispersion resin (that is, a part of the pigment dispersion resin contained in the electrodeposition coating composition). The resulting mixture is mixed with the pigment dispersion resin (that is, the rest of the pigment dispersion resin contained in the electrodeposition coating composition) and the pigment.

The mixing conditions such as the temperature and the stirring rate in the mixing of the metal compound (B) with the pigment dispersion resin may be conditions that are usually carried out in the production of a coating composition, and the mixing can be carried out, for example, at a temperature of 10° C. or more and 50° C. or less, and preferably 20° C. or more and 40° C. or less, at a stirring rate at which a stirring flow capable of dispersing each component is generated. The stirring time can be arbitrarily selected depending on the scale of a reaction system, a stirrer and so on. The stirring time may be, for example, 5 minutes or more and 2 hours or less.

The mixture thus obtained is mixed with the pigment dispersion resin and the pigment. The method of mixing the pigment dispersion resin with the pigment may be any method. For example, the remaining pigment dispersion resin and the pigment may be mixed in advance and then mixed with the mixture obtained as described above. By this mixing, a pigment dispersion paste is prepared. The conditions such as the temperature and the stirring rate in this mixing may be conditions that are usually carried out in the production of a coating composition, and the mixing can be carried out, for example, at a temperature of 10° C. or more and 50° C. or less, and preferably 20° C. or more and 40° C. or less, at a stirring rate at which a stirring flow capable of dispersing the pigment is generated. As for the stirring time, stirring is preferably until the pigment has a dispersion particle size of 10 μm or less, for example. Here, the dispersion particle size of the pigment can be determined by measuring the volume-average particle diameter of the pigment.

In the Embodiment 2, the pigment dispersion paste is prepared through a step of mixing a mixture obtained by mixing the metal compound (B) with the pigment dispersion resin and the capping agent, with the pigment dispersion resin and the pigment.

In this embodiment, first, the metal compound (B) is mixed with the pigment dispersion resin (that is, a part of the pigment dispersion resin contained in the electrodeposition coating composition) and a capping agent. In this mixing, the capping agent is preferably added after mixing the metal compound (B) with the pigment dispersion resin. Next, the resulting mixture is mixed with the pigment dispersion resin (that is, the rest of the pigment dispersion resin contained in the electrodeposition coating composition) and the pigment. The method for mixing the resulting mixture with the pigment dispersion resin and the pigment may be any method. For example, the remaining pigment dispersion resin and the pigment may be mixed in advance and then mixed with the mixture obtained as described above.

The mixing conditions such as the mixing temperature and the stirring rate in this embodiment may be conditions usually carried out in the production of a coating composition, and more specifically, may be the same conditions as in the Embodiment 1 described above.

In the Embodiment 3, the pigment dispersion paste is prepared through a step of mixing a mixture obtained by mixing the metal compound (B) with an organic acid in advance and subsequently mixing the resulting mixture with the metal compound (B), the pigment dispersion resin, and the capping agent, with the pigment dispersion resin and the pigment.

The metal compound (B) and the organic acid are mixed together prior to the other components to prepare a mixture. By mixing the metal compound (B) and the organic acid in advance to prepare a mixture, the solubility and the dispersibility of the metal compound (B) are improved. As a result, the catalytic activity is improved, so that a coating film superior in curability and corrosion resistance can be formed.

Mixing of the metal compound (B) with the organic acid can be performed, for example, by dispersing particles of the metal compound (B) by stirring in an organic acid aqueous solution obtained by mixing the organic acid with a solvent (particularly, an aqueous solvent). The conditions such as the temperature and the stirring rate in the mixing may be conditions that are usually carried out in the production of a coating composition, and the mixing can be carried out, for example, at a temperature of 10° C. or more and 30° C. or less, preferably under a room temperature condition, at a stirring rate at which a stirring flow capable of dispersing the pigment is generated. The stirring time can be appropriately chosen according to the size of the reaction system, and for example, can be chosen within the range of 0.1 hours or more and 24 hours or less.

The mixture thus obtained is mixed with a pigment dispersion resin and a capping agent to prepare a dispersion. The mixing order of the mixture, the pigment dispersion resin, and the capping agent may be arbitrary. For example, the mixture, the pigment dispersion resin, and the capping agent may be simultaneously added and mixed, or the capping agent may be added after mixing the mixture with the pigment dispersion resin, or the pigment dispersion resin may be added after mixing the mixture with the capping agent. The conditions such as the temperature and the stirring rate in this mixing may be conditions that are usually carried out in the production of a coating composition, and the mixing can be carried out, for example, at a temperature of 10° C. or more and 50° C. or less, and preferably 20° C. or more and 40° C. or less, at a stirring rate at which a stirring flow capable of dispersing each of the mixture, the pigment dispersion resin, and the capping agent is generated. The stirring time can be arbitrarily selected depending on the scale of a reaction system, a stirrer and so on. The stirring time may be, for example, 5 minutes or more and 1 hour or less.

The amount of the pigment dispersion resin, which is represented by the ratio (solid mass ratio) of the pigment and the pigment dispersion resin contained in the pigment dispersion paste, is preferably within the range of pigment/pigment dispersion resin=1/0.1 to 1/1.5, and more preferably within the range of pigment/pigment dispersion resin=1/0.1 to 1/1.1. When the amount of the pigment dispersion resin is within the above range, there is an advantage that good curability and good pigment dispersion stability can be secured.

A pigment dispersion paste is prepared by mixing a pigment with the dispersion prepared by the mixing of the metal compound (B), the pigment dispersion resin, and the capping agent. The conditions such as the temperature and the stirring rate in this mixing may be conditions that are usually carried out in the production of a coating composition, and the mixing can be carried out, for example, at a temperature of 10° C. or more and 50° C. or less, and preferably 20° C. or more and 40° C. or less, at a stirring rate at which a stirring flow capable of dispersing the pigment is generated. As for the stirring time, stirring is preferably until the pigment has a dispersion particle size of 10 μm or less, for example. Here, the dispersion particle size of the pigment can be determined by measuring the volume-average particle diameter of the pigment.

Production of Electrodeposition Coating Composition

The cationic electrodeposition coating composition can be prepared by mixing the coating film-forming resin (A) with the pigment dispersion paste. The mixing ratio of the coating film-forming resin (A) to the pigment dispersion paste in terms of solid mass ratio is preferably within the range of coating film-forming resin (A):pigment dispersion paste=1:0.1 to 1:0.4, and more preferably within the range of 1:0.15 to 1:0.3.

The solid content of the cationic electrodeposition coating composition is preferably 1% by mass or more and 30% by mass or less based on the total amount of the electrodeposition coating composition.

The cationic electrodeposition coating composition preferably has a pH of 4.5 or more and 7 or more. The pH of the electrodeposition coating composition can be set within the above range by adjusting the amount of a neutralizing acid to be used, the amount of a free acid to be added, etc. The pH of the electrodeposition coating composition can be measured using a commercially available pH meter having a temperature compensation function.

The milligram equivalent (mEq(A)) of an acid per 100 g of the solid content of the electrodeposition coating composition is preferably 40 or more and 120 or less. The milligram equivalent (mEq(A)) of an acid per 100 g of the resin solid content of the electrodeposition coating composition can be adjusted by the amount of a neutralizing acid and the amount of a free acid.

The mEq(A) as referred to herein is an abbreviation of mg equivalent (acid), which is the sum total of mg equivalents of all acids per 100 g of the solid content of the coating material. The mEq(A) can be measured by precisely weighing about 10 g of a solid of an electrodeposition coating composition, dissolving it in about 50 ml of a solvent (THF: tetrahydrofuran), then performing potentiometric titration using a 1/10 N NaOH solution and thereby determining the amount of an acid contained in the electrodeposition coating composition.

The cationic electrodeposition coating composition may optionally contain additives commonly used in the field of coatings, e.g., organic solvents such as ethylene glycol monobutyl ether, ethylene glycol monohexyl ether, ethylene glycol monoethylhexyl ether, propylene glycol monobutyl ether, dipropylene glycol monobutyl ether, propylene glycol monophenyl ether or the like, drying inhibitors, surfactants such as antifoaming agents, viscosity modifiers such as acrylic resin fine particles, cratering inhibitors, inorganic anticorrosive agents such as vanadium salts, copper, iron, manganese, magnesium, calcium salts or the like. In addition to these, known auxiliary complexing agents, buffers, smoothing agents, stress relaxation agents, brighteners, semi-brighteners, antioxidants, ultraviolet absorbers, etc. may be blended according to the intended purpose. These additives may be mixed at the time of preparing the coating film-forming resin (A), or may be mixed at the time of preparing the pigment dispersion paste, or may be mixed at the time of or after the mixing of the coating film-forming resin (A) and the pigment dispersion paste.

Electrodeposition Coating and Formation of Electrodeposition Coating Film

Using the cationic electrodeposition coating composition, electrodeposition coating and electrodeposition coating film formation can be applied onto an article to be coated. In electrodeposition coating using the cationic electrodeposition coating composition, an article to be coated is used as a cathode, and a voltage is applied between the cathode and an anode. As a result, an electrodeposition coating film is deposited on the article to be coated.

In an electrodeposition coating step, electrodeposition coating is performed by immersing an article to be coated in an electrodeposition coating composition, and then applying a voltage of 50 V or more and 450 V or less. During electrodeposition coating, the bath liquid temperature of the coating composition is usually adjusted to 10° C. or more and 45° C. or less.

The time for which the voltage is applied varies depending on electrodeposition conditions, and in general, it may be 2 minutes or more and 5 minutes or less. The film thickness of the electrodeposition coating film is adjusted preferably to a thickness that leads to an electrodeposition coating film finally obtained by heating and curing having a thickness of 5 μm or more and 40 μm or less, more preferably 10 μm or more and 25 μm or less.

After completion of the electrodeposition process, the electrodeposition coating film obtained as described above is heated at 120° C. or more and 260° C. or less, preferably 140° C. or more and 220° C. or less, for 10 minutes or more and 30 minutes or less as it is or after being rinsed, whereby a heat cured electrodeposition coating film is formed.

As an article to be coated with the cationic electrodeposition coating composition, various articles that allow current to flow through it can be used. Examples of the usable article to be coated include cold-rolled steel sheets, hot-rolled steel sheets, stainless steels, electrogalvanized steel sheets, hot-dip galvanized steel sheets, zinc-aluminum alloy-based plated steel sheets, zinc-iron alloy-based plated steel sheets, zinc-magnesium alloy-based plated steel sheets, zinc-aluminum-magnesium alloy-based plated steel sheets, aluminum-based plated steel sheets, aluminum-silicon alloy-based steel sheets, tin-based plated steel sheets or the like.

Inclusion of both the metal compound (B) and the silicone compound (C) within specific content ranges affords an advantage that the cationic electrodeposition coating composition exhibits good anti-cratering property. The cationic electrodeposition coating composition further has an advantage that the coating film appearance of the resulting cured electrodeposition coating film is also good.

EXAMPLES

The present invention will be described hereafter in more detail by way of examples, to which the present invention is not intended to be limited. In the examples, "parts" and "%" are on a mass basis unless otherwise indicated.

In the examples and the comparative examples, the following was used as a silicone compound.

Silicone compound: TEGO Wet 265 manufactured by Evonik (SP value=12.7, polyether-modified silicone compound, concentration of silicone compound: 52% by mass)

Production Example 1: Production of Pigment Dispersion Resin

Preparation of 2-Ethylhexanol Half-Blocked Isophorone Diisocyanate 222.0 parts of isophorone diisocyanate (hereinafter, abbreviated as IPDI) was added in a reaction vessel equipped with a stirrer, a condenser tube, a nitrogen inlet tube and a thermometer, and was diluted with 39.1 parts of methyl isobutyl ketone (MIBK), and 0.2 parts of dibutyltin dilaurate was added thereto. Thereafter, the mixture was heated to 50° C., and 131.5 parts of 2-ethylhexanol was then added dropwise under stirring in a dry nitrogen atmosphere in 2 hours, affording 2-ethylhexanol half-blocked IPDI (solid content: 90.0% by mass).

Preparation of Quaternization Agent 87.2 parts of dimethylethanolamine, 117.6 parts of a 75% lactic acid aqueous solution and 39.2 parts of ethylene glycol mono-n-butyl ether were sequentially added in a reaction vessel, and stirred at 65° C. for 30 minutes, and thus a quaternization agent was prepared.

Production of Pigment Dispersion Resin

A reaction vessel was charged with 710.0 parts of a bisphenol A-type epoxy resin (trade name: DER-331J, manufactured by The Dow Chemical Company) and 289.6 parts of bisphenol A, which were then reacted at a temperature of 150 to 160° C. for 1 hour in a nitrogen atmosphere. Then, after cooling to 120° C., 498.8 parts of the previously prepared 2-ethylhexanol half-blocked IPDI (MIBK solution) was added. The reaction mixture was stirred at a temperature of 110 to 120° C. for 1 hour, and 463.4 parts of ethylene glycol mono-n-butyl ether was added thereto. The mixture was cooled to a temperature of 85 to 95° C. and 196.7 parts of the previously prepared quaternization agent was added thereto. The reaction mixture was held at 85 to 95° C. until the acid value was 1, and 964 parts of deionized water was then added, affording a desired pigment dispersion resin (solid content: 50% by mass). The hydroxyl value of the obtained pigment dispersion resin was 75 mg KOH/g.

Production Example 2: Production of Aminated Resin

First, 92 parts of methyl isobutyl ketone, 940 parts of a bisphenol A-type epoxy resin (trade name: DER-331J, produced by The Dow Chemical Company), 382 parts of bisphenol A, 63 parts of octylic acid and 2 parts of dimethylbenzylamine were added, and the temperature in the reaction vessel was held at 140° C. A reaction was carried out until the epoxy equivalent reached 1110 g/eq, and then the mixture was cooled until the temperature in the reaction vessel reached 120° C. A mixture of 78 parts of diethylenetriamine diketimine (solution in methyl isobutyl ketone having a solid content of 73%) and 92 parts of diethanolamine was then added, and the mixture was reacted at 120° C. for 1 hour, affording an aminated resin (amine-modified epoxy resin). The resin had a number-average molecular weight of 2,560, an amine value (milligram equivalent of a base per 100 g of the resin solid content: mEq(B)) of 50 mg KOH/g (of which the amine value derived from a primary amine was 14 mg KOH/g), and a hydroxyl value of 240 mg KOH/g.

Production Example 3-1: Production of Blocked Isocyanate Curing Agent (1)

1680 parts of hexamethylene diisocyanate (HDI) and 732 parts of MIBK were added in a reaction vessel, and heated to 60° C. A solution prepared by dissolving 346 parts of trimethylolpropane in 1067 parts of MEK oxime was added thereto dropwise at 60° C. in 2 hours. Further, the mixture was heated at 75° C. for 4 hours, disappearance of an absorption based on an isocyanate group was then confirmed in IR spectrum measurement, the mixture was allowed to cool. Thereafter, 27 parts of MIBK was added, affording a blocked isocyanate curing agent (1) having a solid content of 78%. The isocyanate group value was 252 mg KOH/g.

Production Example 3-2: Production of Blocked Isocyanate Curing Agent (2)

A reaction vessel was charged with 1340 parts of 4,4'-diphenylmethane diisocyanate and 277 parts of MIBK, which were then heated to 80° C. Thereafter, a solution prepared by dissolving 226 parts of ε-caprolactam in 944 parts of butyl cellosolve was added thereto dropwise at 80° C. in 2 hours. Further, the mixture was heated at 100° C. for 4 hours, disappearance of an absorption based on an isocyanate group was then confirmed in IR spectrum measurement, the mixture was allowed to cool. Thereafter, 349 parts of MIBK was added, affording a blocked isocyanate curing agent (2) (solid content: 80%). The isocyanate group value was 251 mg KOH/g.

Production Example 4: Production of Amine-Modified Epoxy Resin Emulsion (1)

First, 350 parts (solid content) of the aminated resin obtained in Production Example 2 was mixed with 75 parts (solid content) of the blocked isocyanate curing agent (1) obtained in Production Example 3-1 and 75 parts (solid content) of the blocked isocyanate curing agent (2) obtained in Production Example 3-2, and ethylene glycol mono-2-ethylhexyl ether was added in an amount of 3% (15 parts) based on the solid content. Next, the mixture was neutralized by adding formic acid such that the addition amount corresponded to a resin neutralization ratio of 40%. Thereafter, ion-exchanged water was added to dilute the mixture slowly. Subsequently, methyl isobutyl ketone was removed under reduced pressure such that the solid content reached 40%, affording an amine-modified epoxy resin emulsion (1).

Example 1

Production of Pigment Dispersion Paste

First, 0.04 parts of a 50% aqueous lactic acid solution and 0.05 parts of yttrium oxide were added to 125.7 parts of ion-exchanged water such that the solid content concentration of a dispersion paste was 47% by mass, and the mixture was stirred and mixed at room temperature for 1 hour. Thereto was added 81.4 parts (in terms of a resin solid content) of the pigment dispersion resin obtained in Production Example 1, and the mixture was stirred at 1000 rpm at room temperature for 1 hour.

Then, 2.6 parts of a 10% aqueous tartaric acid solution was added, and subsequently 7.5 parts (in terms of resin solid content) of the amine-modified epoxy resin emulsion (1) obtained in Production Example 4 (used as an emulsion (capping agent) containing an amine-modified epoxy resin) was added and mixed. Further, 1 part of carbon, 45.6 parts of titanium oxide, and 63.6 parts of Satintone (calcined kaolin) as pigments were added, and the mixture was stirred at 2000 rpm at 40° C. for 1 hour using a sand mill, thereby affording a pigment dispersion paste.

Production of Electrodeposition Coating Composition

A stainless steel vessel was charged with 492.8 parts of ion-exchanged water, 369.1 parts (in terms of resin solid content) of the amine-modified epoxy resin emulsion (1) prepared in Production Example 4 (used as a resin emulsion of the coating film-forming resin (A)), 91.6 parts of the pigment dispersion paste, and 0.015 parts of a silicone compound, which were then mixed. Thereafter, the mixture was aged at 40° C. for 16 hours, affording a cationic electrodeposition coating composition.

Example 2

Production of Pigment Dispersion Paste

To 125.7 parts of ion-exchanged water were added 0.04 parts of a 50% aqueous lactic acid solution and 0.05 parts of lanthanum oxide such that the solid content concentration of a dispersion paste was 47% by mass, and the mixture was then stirred and mixed at room temperature for 1 hour. Thereto was added 81.4 parts (in terms of a resin solid content) of the pigment dispersion resin obtained in Production Example 1, and the mixture was stirred at 1000 rpm at room temperature for 1 hour.

Then, 2.6 parts of a 10% aqueous tartaric acid solution was added, and subsequently 7.5 parts (in terms of resin solid content) of the amine-modified epoxy resin emulsion (1) obtained in Production Example 4 (used as an emulsion (capping agent) containing an amine-modified epoxy resin) was added and mixed. Further, 1 part of carbon, 45.6 parts of titanium oxide, and 63.7 parts of Satintone (calcined kaolin) as pigments were added, and the mixture was stirred at 2000 rpm at 40° C. for 1 hour using a sand mill, thereby affording a pigment dispersion paste.

Production of Electrodeposition Coating Composition

A stainless steel vessel was charged with 492.8 parts of ion-exchanged water, 369.1 parts (in terms of resin solid content) of the amine-modified epoxy resin emulsion (1) prepared in Production Example 4 (used as a resin emulsion of the coating film-forming resin (A)), 91.6 parts of the pigment dispersion paste, and 0.015 parts of a silicone compound, which were then mixed. Thereafter, the mixture was aged at 40° C. for 16 hours, affording a cationic electrodeposition coating composition.

Example 3

Production of Pigment Dispersion Paste

To 125.7 parts of ion-exchanged water were added 0.04 parts of a 50% aqueous lactic acid solution and 0.05 parts of cerium oxide such that the solid content concentration of a dispersion paste was 47% by mass, and the mixture was then stirred and mixed at room temperature for 1 hour. Thereto was added 81.4 parts (in terms of a resin solid content) of the pigment dispersion resin obtained in Production Example 1, and the mixture was stirred at 1000 rpm at room temperature for 1 hour.

Then, 2.6 parts of a 10% aqueous tartaric acid solution was added, and subsequently 7.5 parts (in terms of resin solid content) of the amine-modified epoxy resin emulsion (1) obtained in Production Example 4 (used as an emulsion (capping agent) containing an amine-modified epoxy resin) was added and mixed. Further, 1 part of carbon, 45.6 parts of titanium oxide, and 63.7 parts of Satintone (calcined kaolin) as pigments were added, and the mixture was stirred at 2000 rpm at 40° C. for 1 hour using a sand mill, thereby affording a pigment dispersion paste.

Production of Electrodeposition Coating Composition

A stainless steel vessel was charged with 492.8 parts of ion-exchanged water, 369.1 parts (in terms of resin solid content) of the amine-modified epoxy resin emulsion (1) prepared in Production Example 4 (used as a resin emulsion of the coating film-forming resin (A)), 91.6 parts of the pigment dispersion paste, and 0.015 parts of a silicone compound, which were then mixed. Thereafter, the mixture was aged at 40° C. for 16 hours, affording a cationic electrodeposition coating composition.

Example 4

Production of Pigment Dispersion Paste

To 125.7 parts of ion-exchanged water were added 0.04 parts of a 50% aqueous lactic acid solution and 0.05 parts of neodymium oxide such that the solid content concentration of a dispersion paste was 47% by mass, and the mixture was then stirred and mixed at room temperature for 1 hour. Thereto was added 81.4 parts (in terms of a resin solid content) of the pigment dispersion resin obtained in Production Example 1, and the mixture was stirred at 1000 rpm at room temperature for 1 hour.

Then, 2.6 parts of a 10% aqueous tartaric acid solution was added, and subsequently 7.5 parts (in terms of resin solid content) of the amine-modified epoxy resin emulsion (1) obtained in Production Example 4 (used as an emulsion (capping agent) containing an amine-modified epoxy resin) was added and mixed. Further, 1 part of carbon, 45.6 parts of titanium oxide, and 63.7 parts of Satintone (calcined kaolin) as pigments were added, and the mixture was stirred at 2000 rpm at 40° C. for 1 hour using a sand mill, thereby affording a pigment dispersion paste.

Production of Electrodeposition Coating Composition

A stainless steel vessel was charged with 492.8 parts of ion-exchanged water, 369.1 parts (in terms of resin solid content) of the amine-modified epoxy resin emulsion (1) prepared in Production Example 4 (used as a resin emulsion of the coating film-forming resin (A)), 91.6 parts of the pigment dispersion paste, and 0.015 parts of a silicone compound, which were then mixed. Thereafter, the mixture was aged at 40° C. for 16 hours, affording a cationic electrodeposition coating composition.

Example 5

Production of Pigment Dispersion Paste

To 125.7 parts of ion-exchanged water were added 0.04 parts of a 50% aqueous lactic acid solution and 0.05 parts of bismuth oxide such that the solid content concentration of a dispersion paste was 47% by mass, and the mixture was then stirred and mixed at room temperature for 1 hour. Thereto was added 81.4 parts (in terms of a resin solid content) of the pigment dispersion resin obtained in Production Example 1, and the mixture was stirred at 1000 rpm at room temperature for 1 hour.

Then, 2.6 parts of a 10% aqueous tartaric acid solution was added, and subsequently 7.5 parts (in terms of resin solid content) of the amine-modified epoxy resin emulsion (1) obtained in Production Example 4 (used as an emulsion (capping agent) containing an amine-modified epoxy resin) was added and mixed. Further, 1 part of carbon, 45.6 parts of titanium oxide, and 63.5 parts of Satintone (calcined kaolin) as pigments were added, and the mixture was stirred at 2000 rpm at 40° C. for 1 hour using a sand mill, thereby affording a pigment dispersion paste.

Production of Electrodeposition Coating Composition

A stainless steel vessel was charged with 492.8 parts of ion-exchanged water, 369.1 parts (in terms of resin solid content) of the amine-modified epoxy resin emulsion (1) prepared in Production Example 4 (used as a resin emulsion of the coating film-forming resin (A)), 91.6 parts of the pigment dispersion paste, and 0.015 parts of a silicone compound, which were then mixed. Thereafter, the mixture was aged at 40° C. for 16 hours, affording a cationic electrodeposition coating composition.

Example 6

Production of Pigment Dispersion Paste

To 130.4 parts of ion-exchanged water were added 0.006 parts of a 50% aqueous lactic acid solution and 0.01 parts of bismuth oxide such that the solid content concentration of a dispersion paste was 47% by mass, and the mixture was then stirred at room temperature for 1 hour. Thereto were further added 0.037 parts of a 50% aqueous lactic acid solution and 0.04 parts of lanthanum oxide, and the mixture was stirred and mixed at room temperature for 1 hour. Thereto was added 85.2 parts (in terms of a resin solid content) of the pigment dispersion resin obtained in Production Example 1, and the mixture was stirred at 1000 rpm at room temperature for 1 hour.

Then, 2.7 parts of a 10% aqueous tartaric acid solution was added, and subsequently 7.5 parts (in terms of resin solid content) of the amine-modified epoxy resin emulsion (1) obtained in Production Example 4 (used as an emulsion (capping agent) containing an amine-modified epoxy resin) was added and mixed. Further, 1 part of carbon, 47.5 parts of titanium oxide, and 66.1 parts of Satintone (calcined kaolin) as pigments were added, and the mixture was stirred at 2000 rpm at 40° C. for 1 hour using a sand mill, thereby affording a pigment dispersion paste.

Production of Electrodeposition Coating Composition

A stainless steel vessel was charged with 492.8 parts of ion-exchanged water, 369.1 parts (in terms of resin solid content) of the amine-modified epoxy resin emulsion (1) prepared in Production Example 4 (used as a resin emulsion of the coating film-forming resin (A)), 91.6 parts of the pigment dispersion paste, and 0.015 parts of a silicone compound, which were then mixed. Thereafter, the mixture was aged at 40° C. for 16 hours, affording a cationic electrodeposition coating composition.

Example 7

A cationic electrodeposition coating composition was produced in the same manner as in Example 1 except that the amount of the silicone compound was changed to 7.4 parts in the production of the electrodeposition coating composition.

Example 8

A cationic electrodeposition coating composition was produced in the same manner as in Example 2 except that the amount of the silicone compound was changed to 7.4 parts in the production of the electrodeposition coating composition.

Example 9

A cationic electrodeposition coating composition was produced in the same manner as in Example 3 except that the amount of the silicone compound was changed to 7.4 parts in the production of the electrodeposition coating composition.

Example 10

A cationic electrodeposition coating composition was produced in the same manner as in Example 4 except that the amount of the silicone compound was changed to 7.4 parts in the production of the electrodeposition coating composition.

Example 11

A cationic electrodeposition coating composition was produced in the same manner as in Example 5 except that the amount of the silicone compound was changed to 7.4 parts in the production of the electrodeposition coating composition.

Example 12

A cationic electrodeposition coating composition was produced in the same manner as in Example 6 except that the amount of the silicone compound was changed to 7.4 parts in the production of the electrodeposition coating composition.

Example 13

A cationic electrodeposition coating composition was produced in the same manner as in Example 1 except that 0.78 parts of a 50% aqueous lactic acid solution and 1 part of yttrium oxide were used in the production of the pigment dispersion paste and 2.4 parts of the silicone compound was used in the production of the electrodeposition coating composition.

Example 14

A cationic electrodeposition coating composition was produced in the same manner as in Example 2 except that 0.73 parts of a 50% aqueous lactic acid solution and 1 part of yttrium oxide were used in the production of the pigment dispersion paste and 2.4 parts of a silicone compound was used in the production of the electrodeposition coating composition.

Example 15

A cationic electrodeposition coating composition was produced in the same manner as in Example 3 except that 0.70 parts of a 50% aqueous lactic acid solution and 1 part of yttrium oxide were used in the production of the pigment dispersion paste and 2.4 parts of a silicone compound was used in the production of the electrodeposition coating composition.

Example 16

A cationic electrodeposition coating composition was produced in the same manner as in Example 4 except that 0.74 parts of a 50% aqueous lactic acid solution and 1 part of yttrium oxide were used in the production of the pigment dispersion paste and 2.4 parts of the silicone compound was used in the production of the electrodeposition coating composition.

Example 17

A cationic electrodeposition coating composition was produced in the same manner as in Example 5 except that 0.77 parts of a 50% aqueous lactic acid solution and 1 part of yttrium oxide were used in the production of the pigment dispersion paste and 2.4 parts of the silicone compound was used in the production of the electrodeposition coating composition.

Example 18

Production of Pigment Dispersion Paste

To 130.1 parts of ion-exchanged water were added 0.15 parts of a 50% aqueous lactic acid solution and 0.2 parts of bismuth oxide such that the solid content concentration of a dispersion paste was 47% by mass, and the mixture was then stirred at room temperature for 1 hour. Thereto were further added 0.88 parts of a 50% aqueous lactic acid solution and 0.8 parts of lanthanum oxide, and the mixture was stirred and mixed at room temperature for 1 hour. Thereto was added 85.2 parts (in terms of a resin solid content) of the pigment dispersion resin obtained in Production Example 1, and the mixture was stirred at 1000 rpm at room temperature for 1 hour.

Then, 2.7 parts of a 10% aqueous tartaric acid solution was added, and subsequently 7.5 parts (in terms of resin solid content) of the amine-modified epoxy resin emulsion (1) obtained in Production Example 4 (used as an emulsion (capping agent) containing an amine-modified epoxy resin) was added and mixed. Further, 1 part of carbon, 47.5 parts of titanium oxide, and 66.1 parts of Satintone (calcined kaolin) as pigments were added, and the mixture was stirred at 2000 rpm at 40° C. for 1 hour using a sand mill, thereby affording a pigment dispersion paste.

Production of Electrodeposition Coating Composition

A stainless steel vessel was charged with 492.8 parts of ion-exchanged water, 375.1 parts (in terms of resin solid content) of the amine-modified epoxy resin emulsion (1) prepared in Production Example 4 (used as a resin emulsion of the coating film-forming resin (A)), 92.1 parts of the pigment dispersion paste, and 2.4 parts of a silicone compound, which were then mixed. Thereafter, the mixture was aged at 40° C. for 16 hours, affording a cationic electrodeposition coating composition.

Example 19

A cationic electrodeposition coating composition was produced in the same manner as in Example 1 except that 2.34 parts of a 50% aqueous lactic acid solution and 3 parts of yttrium oxide were used in the production of the pigment dispersion paste.

Example 20

A cationic electrodeposition coating composition was produced in the same manner as in Example 2 except that 2.2 parts of a 50% aqueous lactic acid solution and 3 parts of lanthanum oxide were used in the production of the pigment dispersion paste.

Example 21

A cationic electrodeposition coating composition was produced in the same manner as in Example 3 except that 2.1 parts of a 50% aqueous lactic acid solution and 3 parts of cerium oxide were used in the production of the pigment dispersion paste.

Example 22

A cationic electrodeposition coating composition was produced in the same manner as in Example 4 except that 2.2 parts of a 50% aqueous lactic acid solution and 3 parts of neodymium oxide were used in the production of the pigment dispersion paste.

Example 23

A cationic electrodeposition coating composition was produced in the same manner as in Example 5 except that 2.3 parts of a 50% aqueous lactic acid solution and 3 parts of bismuth oxide were used in the production of the pigment dispersion paste.

Example 24

Production of Pigment Dispersion Paste

To 128.1 parts of ion-exchanged water were added 0.43 parts of a 50% aqueous lactic acid solution and 0.6 parts of bismuth oxide such that the solid content concentration of a dispersion paste was 47% by mass, and the mixture was then stirred at room temperature for 1 hour. Thereto were further added 2.6 parts of a 50% aqueous lactic acid solution and 2.4 parts of lanthanum oxide, and the mixture was stirred and mixed at room temperature for 1 hour. Thereto was added 85.2 parts (in terms of a resin solid content) of the pigment dispersion resin obtained in Production Example 1, and the mixture was stirred at 1000 rpm at room temperature for 13 hours.

Then, 2.7 parts of a 10% aqueous tartaric acid solution was added, and subsequently 7.5 parts (in terms of resin solid content) of the amine-modified epoxy resin emulsion (1) obtained in Production Example 4 (used as an emulsion (capping agent) containing an amine-modified epoxy resin) was added and mixed. Further, 1 part of carbon, 47.5 parts of titanium oxide, and 63.7 parts of Satintone (calcined kaolin) as pigments were added, and the mixture was stirred at 2000 rpm at 40° C. for 1 hour using a sand mill, thereby affording a pigment dispersion paste.

Production of Electrodeposition Coating Composition

A stainless steel vessel was charged with 492.8 parts of ion-exchanged water, 375.1 parts (in terms of resin solid content) of the amine-modified epoxy resin emulsion (1) prepared in Production Example 4 (used as a resin emulsion of the coating film-forming resin (A)), 91.6 parts of the pigment dispersion paste, and 0.015 parts of a silicone compound, which were then mixed. Thereafter, the mixture was aged at 40° C. for 16 hours, affording a cationic electrodeposition coating composition.

Example 25

A cationic electrodeposition coating composition was produced in the same manner as in Example 19 except that the amount of the silicone compound was changed to 7.4 parts in the production of the electrodeposition coating composition.

Example 26

A cationic electrodeposition coating composition was produced in the same manner as in Example 20 except that the amount of the silicone compound was changed to 7.4 parts in the production of the electrodeposition coating composition.

Example 27

A cationic electrodeposition coating composition was produced in the same manner as in Example 21 except that the amount of the silicone compound was changed to 7.4 parts in the production of the electrodeposition coating composition.

Example 28

A cationic electrodeposition coating composition was produced in the same manner as in Example 22 except that the amount of the silicone compound was changed to 7.4 parts in the production of the electrodeposition coating composition.

Example 29

A cationic electrodeposition coating composition was produced in the same manner as in Example 23 except that the amount of the silicone compound was changed to 7.4 parts in the production of the electrodeposition coating composition.

Example 30

A cationic electrodeposition coating composition was produced in the same manner as in Example 24 except that the amount of the silicone compound was changed to 7.4 parts in the production of the electrodeposition coating composition.

Comparative Example 1

A cationic electrodeposition coating composition was produced in the same manner as in Example 1 except that 0.019 parts of a 50% aqueous lactic acid solution and 0.025 parts of yttrium oxide were used in the production of the pigment dispersion paste and 0.008 parts of the silicone compound was used in the production of the electrodeposition coating composition.

Comparative Example 2

A cationic electrodeposition coating composition was produced in the same manner as in Example 2 except that 0.018 parts of a 50% aqueous lactic acid solution and 0.025 parts of lanthanum oxide were used in the production of the pigment dispersion paste and 0.008 parts of the silicone compound was used in the production of the electrodeposition coating composition.

Comparative Example 3

A cationic electrodeposition coating composition was produced in the same manner as in Example 3 except that 0.018 parts of a 50% lactic acid aqueous solution and 0.025 parts of cerium oxide were used in the production of the pigment dispersion paste, and 0.008 parts of a silicone compound was used in the production of the electrodeposition coating composition.

Comparative Example 4

A cationic electrodeposition coating composition was produced in the same manner as in Example 4 except that 0.018 parts of a 50% lactic acid aqueous solution and 0.025 parts of neodymium oxide were used in the production of the pigment dispersion paste, and 0.008 parts of a silicone compound was used in the production of the electrodeposition coating composition.

Comparative Example 5

A cationic electrodeposition coating composition was produced in the same manner as in Example 5 except that 0.019 parts of a 50% lactic acid aqueous solution and 0.025 parts of bismuth oxide were used in the production of the pigment dispersion paste, and 0.008 parts of a silicone compound was used in the production of the electrodeposition coating composition.

Comparative Example 6

Production of Pigment Dispersion Paste

To 131.1 parts of ion-exchanged water were added 0.004 parts of a 50% aqueous lactic acid solution and 0.005 parts of bismuth oxide such that the solid content concentration of a dispersion paste was 47% by mass, and the mixture was then stirred at room temperature for 1 hour. Thereto were further added 0.021 parts of a 50% aqueous lactic acid solution and 0.02 parts of lanthanum oxide, and the mixture was stirred and mixed at room temperature for 1 hour. Thereto was added 85.2 parts (in terms of a resin solid content) of the pigment dispersion resin obtained in Production Example 1, and the mixture was stirred at 1000 rpm at room temperature for 1 hour.

Then, 23 parts of a 10% aqueous tartaric acid solution was added, and subsequently 7.5 parts (in terms of resin solid content) of the amine-modified epoxy resin emulsion (1) obtained in Production Example 4 (used as an emulsion (capping agent) containing an amine-modified epoxy resin) was added and mixed. Further, 1 part of carbon, 47.5 parts of titanium oxide, and 66.8 parts of Satintone (calcined kaolin) as pigments were added, and the mixture was stirred at 2000 rpm at 40° C. for 1 hour using a sand mill, thereby affording a pigment dispersion paste.

Production of Electrodeposition Coating Composition

A stainless steel vessel was charged with 492.8 parts of ion-exchanged water, 375.1 parts (in terms of resin solid content) of the amine-modified epoxy resin emulsion (1) prepared in Production Example 4 (used as a resin emulsion of the coating film-forming resin (A)), 91.6 parts of the pigment dispersion paste, and 0.008 parts of a silicone compound, which were then mixed. Thereafter, the mixture was aged at 40° C. for 16 hours, affording a cationic electrodeposition coating composition.

Comparative Example 7

A cationic electrodeposition coating composition was produced in the same manner as in Comparative Example 1 except that the amount of the silicone compound was changed to 9.72 parts in the production of the electrodeposition coating composition.

Comparative Example 8

A cationic electrodeposition coating composition was produced in the same manner as in Comparative Example 2 except that the amount of the silicone compound was changed to 9.72 parts in the production of the electrodeposition coating composition.

Comparative Example 9

A cationic electrodeposition coating composition was produced in the same manner as in Comparative Example 3 except that the amount of the silicone compound was changed to 9.72 parts in the production of the electrodeposition coating composition.

Comparative Example 10

A cationic electrodeposition coating composition was produced in the same manner as in Comparative Example 4 except that the amount of the silicone compound was changed to 9.72 parts in the production of the electrodeposition coating composition.

Comparative Example 11

A cationic electrodeposition coating composition was produced in the same manner as in Comparative Example 5 except that the amount of the silicone compound was changed to 9.72 parts in the production of the electrodeposition coating composition.

Comparative Example 12

A cationic electrodeposition coating composition was produced in the same manner as in Comparative Example 6 except that the amount of the silicone compound was changed to 9.72 parts in the production of the electrodeposition coating composition.

Comparative Example 13

A cationic electrodeposition coating composition was produced in the same manner as in Example 1 except that 3.11 parts of a 50% aqueous lactic acid solution and 4 parts of yttrium oxide were used in the production of the pigment dispersion paste and 0.008 parts of the silicone compound was used in the production of the electrodeposition coating composition.

Comparative Example 14

A cationic electrodeposition coating composition was produced in the same manner as in Example 2 except that 2.94 parts of a 50% aqueous lactic acid solution and 4 parts of lanthanum oxide were used in the production of the pigment dispersion paste and 0.008 parts of the silicone compound was used in the production of the electrodeposition coating composition.

Comparative Example 15

A cationic electrodeposition coating composition was produced in the same manner as in Example 3 except that 2.10 parts of a 50% lactic acid aqueous solution and 4 parts of cerium oxide were used in the production of the pigment dispersion paste, and 0.008 parts of a silicone compound was used in the production of the electrodeposition coating composition.

Comparative Example 16

A cationic electrodeposition coating composition was produced in the same manner as in Example 4 except that 2.95 parts of a 50% lactic acid aqueous solution and 4 parts of neodymium oxide were used in the production of the pigment dispersion paste, and 0.008 parts of a silicone compound was used in the production of the electrodeposition coating composition.

Comparative Example 17

A cationic electrodeposition coating composition was produced in the same manner as in Example 5 except that 3.09 parts of a 50% lactic acid aqueous solution and 4 parts of bismuth oxide were used in the production of the pigment dispersion paste, and 0.008 parts of a silicone compound was used in the production of the electrodeposition coating composition.

Comparative Example 18

Production of Pigment Dispersion Paste

To 127.1 parts of ion-exchanged water were added 0.58 parts of a 50% aqueous lactic acid solution and 0.75 parts of bismuth oxide such that the solid content concentration of a dispersion paste was 47% by mass, and the mixture was then stirred at room temperature for 1 hour. Thereto were further added 3.49 parts of a 50% aqueous lactic acid solution and 3.25 parts of lanthanum oxide, and the mixture was stirred and mixed at room temperature for 1 hour. Thereto was added 85.2 parts (in terms of a resin solid content) of the pigment dispersion resin obtained in Production Example 1, and the mixture was stirred at 1000 rpm at room temperature for 1 hour.

Then, 2.7 parts of a 10% aqueous tartaric acid solution was added, and subsequently 7.5 parts (in terms of resin solid content) of the amine-modified epoxy resin emulsion (1) obtained in Production Example 4 (used as an emulsion (capping agent) containing an amine-modified epoxy resin) was added and mixed. Further, 1 part of carbon, 47.5 parts of titanium oxide, and 62.6 parts of Satintone (calcined kaolin) as pigments were added, and the mixture was stirred at 2000 rpm at 40° C. for 1 hour using a sand mill, thereby affording a pigment dispersion paste.

Production of Electrodeposition Coating Composition

A stainless steel vessel was charged with 492.8 parts of ion-exchanged water, 375.1 parts (in terms of resin solid content) of the amine-modified epoxy resin emulsion (1) prepared in Production Example 4 (used as a resin emulsion of the coating film-forming resin (A)), 91.6 parts of the pigment dispersion paste, and 0.008 parts of a silicone compound, which were then mixed. Thereafter, the mixture was aged at 40° C. for 16 hours, affording a cationic electrodeposition coating composition.

Comparative Example 19

A cationic electrodeposition coating composition was produced in the same manner as in Comparative Example 13 except that the amount of the silicone compound was changed to 9.72 parts in the production of the electrodeposition coating composition.

Comparative Example 20

A cationic electrodeposition coating composition was produced in the same manner as in Comparative Example 14 except that the amount of the silicone compound was changed to 9.72 parts in the production of the electrodeposition coating composition.

Comparative Example 21

A cationic electrodeposition coating composition was produced in the same manner as in Comparative Example 15 except that the amount of the silicone compound was changed to 9.72 parts in the production of the electrodeposition coating composition.

Comparative Example 22

A cationic electrodeposition coating composition was produced in the same manner as in Comparative Example 16 except that the amount of the silicone compound was changed to 9.72 parts in the production of the electrodeposition coating composition.

Comparative Example 23

A cationic electrodeposition coating composition was produced in the same manner as in Comparative Example 17 except that the amount of the silicone compound was changed to 9.72 parts in the production of the electrodeposition coating composition.

Comparative Examples 24

A cationic electrodeposition coating composition was produced in the same manner as in Comparative Example 18 except that the amount of the silicone compound was changed to 9.72 parts in the production of the electrodeposition coating composition.

Comparative Example 25

Production of Pigment Dispersion Paste

To 125.2 parts of ion-exchanged water were added 0.6 parts of a 50% aqueous lactic acid solution and 1 part of potassium hydroxide such that the solid content concentration of a dispersion paste was 47% by mass, and the mixture was then stirred and mixed at room temperature for 1 hour. Thereto was added 81.4 parts (in terms of a resin solid content) of the pigment dispersion resin obtained in Production Example 1, and the mixture was stirred at 1000 rpm at room temperature for 1 hour.

Then, 2.6 parts of a 10% aqueous tartaric acid solution was added, and subsequently 7.5 parts (in terms of resin solid content) of the amine-modified epoxy resin emulsion (1) obtained in Production Example 4 (used as an emulsion (capping agent) containing an amine-modified epoxy resin) was added and mixed. Further, 1 part of carbon, 45.5 parts of titanium oxide, and 62.8 parts of Satintone (calcined kaolin) as pigments were added, and the mixture was stirred at 2000 rpm at 40° C. for 1 hour using a sand mill, thereby affording a pigment dispersion paste.

Production of Electrodeposition Coating Composition

A stainless steel vessel was charged with 492.8 parts of ion-exchanged water, 369.1 parts (in terms of resin solid content) of the amine-modified epoxy resin emulsion (1) prepared in Production Example 4 (used as a resin emulsion of the coating film-forming resin (A)), 91.6 parts of the pigment dispersion paste, and 2.4 parts of a silicone compound, which were then mixed. Thereafter, the mixture was aged at 40° C. for 16 hours, affording a cationic electrodeposition coating composition.

Comparative Example 26

Production of Pigment Dispersion Paste

To 125.2 parts of ion-exchanged water were added 0.6 parts of a 50% aqueous lactic acid solution and 1 part of calcium oxide such that the solid content concentration of a dispersion paste was 47% by mass, and the mixture was then stirred and mixed at room temperature for 1 hour. Thereto was added 81.4 parts (in terms of a resin solid content) of the pigment dispersion resin obtained in Production Example 1, and the mixture was stirred at 1000 rpm at room temperature for 1 hour.

Then, 2.6 parts of a 10% aqueous tartaric acid solution was added, and subsequently 7.5 parts (in terms of resin solid content) of the amine-modified epoxy resin emulsion (1) obtained in Production Example 4 (used as an emulsion (capping agent) containing an amine-modified epoxy resin) was added and mixed. Further, 1 part of carbon, 45.5 parts of titanium oxide, and 62.8 parts of Satintone (calcined kaolin) as pigments were added, and the mixture was stirred at 2000 rpm at 40° C. for 1 hour using a sand mill, thereby affording a pigment dispersion paste.

Production of Electrodeposition Coating Composition

A cationic electrodeposition coating composition was produced by the same procedure as in Comparative Example 25 using the pigment dispersion paste obtained as described above.

Comparative Example 27

A cationic electrodeposition coating composition was produced in the same manner as in Example 18 except that 2.4 parts of an acrylic resin (SP=11.5, solid content: 52%) synthesized from methyl methacrylate, n-butyl acrylate and hydroxyethyl methacrylate was used as a cratering inhibitor instead of 2.4 parts of the silicone compound.

The following evaluation tests were carried out using the cationic electrodeposition coating compositions obtained in the Examples and Comparative Examples described above. The results of the evaluations are shown in the following tables. The amount of each component shown in the following tables is expressed by parts by mass of solid content. Formation of Cured Electrodeposition Coating Film A cold-rolled steel sheet (JIS G3141, SPCC-SD) was immersed in SURFCLEANER EC90 (produced by Nippon Paint Surf Chemicals Co., Ltd.) at 50° C. for 2 minutes, thereby being degreased. Next, the steel sheet was immersed in SURFFINE GL1 (produced by Nippon Paint Surf Chemicals Co., Ltd.) at room temperature for 30 seconds, and immersed in SURFDYNE EC3200 (produced by Nippon Paint Surf Chemicals, Zirconium conversion agent) at 35° C. for 2 minutes. The steel sheet was then rinsed with deionized water.

To the cationic electrodeposition coating composition obtained above, a required amount of 2-ethylhexyl glycol was added such that the electrodeposition coating film had a film thickness of 20 μm after curing.

Thereafter, the steel sheet was fully immersed in the electrodeposition coating composition, and application of a voltage was then immediately started. The voltage was applied under such a condition that the voltage was raised for 30 seconds to 180 V and this voltage was held for 150 seconds. Thus, an uncured electrodeposition coating film was deposited on the article to be coated (cold-rolled steel sheet). The resulting uncured electrodeposition coating film was heated and cured at 160° C. for 15 minutes, affording an electrodeposition coated sheet having a cured electrodeposition coating film having a film thickness of 20 μm. Evaluation of Anti-Cratering Property (Flowing Oil Cratering Property)

A 10%-butyl cellosolve solution was prepared as an oil.

The solution was added to ion-exchanged water to prepare an oil-containing aqueous solution containing 300 ppm of an oil.

Using the cationic electrodeposition coating compositions of the above Examples and Comparative Examples, electrodeposition coating was performed under the same voltage application conditions as described above to deposit an uncured electrodeposition coating film on the steel sheet. Next, the steel sheet with the uncured electrodeposition coating film was immersed in ion-exchanged water.

The steel sheet with the uncured electrodeposition coating film was put on an evaluation table having an inclination of 30° and allowed to stand for 3 minutes. The oil-containing aqueous solution (1 ml) was flowed onto the uncured electrodeposition coating film on the 30° inclined test table in 10 seconds from above of the uncured electrodeposition coating film. Thereafter, the inclination of the evaluation table was increased to 90°, and the evaluation table was allowed to stand for 3 minutes. Then, the uncured electrodeposition coating film was baked and cured at 190° C. for 15 minutes.

The surface of the cured electrodeposition coating film was visually observed, the number of cratering was counted, and evaluation was performed according to the following evaluation criteria.
Evaluation Criteria
⊙ The number of cratering is 5 or less.
○ The number of cratering is 6 or more and 15 or less.

○Δ The number of cratering is 16 or more and 30 or less, and the cratering is shallow and small.
Δ The number of cratering is 16 or more and 30 or less, and the cratering is deep and large.
x The number of cratering is 30 or more.
Evaluation of Anti-Cratering Property (Oil Contamination Cratering Property)

A 10%-butyl cellosolve solution was prepared as an oil.

The solution was mixed in 10 L of an electrodeposition coating composition such that the concentration of the oil was 200 ppm, and the mixture was stirred at 500 rpm for 24 hours.

An L-shaped steel sheet prepared by folding a steel sheet into an L-shape was placed such that at least the horizontal part (5 cm long) of the steel sheet was immersed in the electrodeposition coating composition. At this time, the L-shaped steel sheet was arranged such that the horizontal part of the L-shaped steel sheet was horizontal to the liquid surface of the electrodeposition coating composition and the vertical part of the L-shaped steel sheet was vertical to the liquid surface of the coating composition. The L-shaped steel sheet was electrodeposited such that the dry coating film had a thickness of 20 μm, and thus an uncured coating film was formed.

The resulting uncured coating film was baked and cured at 160° C. for 15 minutes. Other electrodeposition conditions were the same as those of the formation of the cured electrodeposition coating film prepared in the appearance evaluation described above. The evaluation of the oil contamination cratering property is supposed to evaluate the anti-cratering property of the cationic electrodeposition coating composition before coating and during coating.

The coating film surface on the lower surface of the horizontal part of the L-shaped steel sheet was visually observed, the number of cratering was counted, and evaluated according to the following evaluation criteria.
Evaluation Criteria
⊙ There are no cratering.
○ The number of cratering is 3 or less.
○Δ The number of cratering is 4 or more and 10 or less.
Δ The number of cratering is 11 or more and 15 or less.
x The number of cratering is 16 or more.
Appearance Evaluation (Visual Evaluation)

For electrodeposition coated plates having an electrodeposition coating film obtained from the above-described electrodeposition coated plates, whether there are irregularities or not in the coating film appearance was visually evaluated. The evaluation criteria were as follows.
Evaluation Criteria
○ The coated plate has a uniform coating film appearance.
○Δ The coated plate has an almost uniform coating film appearance as a whole, although there are some areas that are visually recognized as slightly uneven.
Δ The coating film appearance is not uniform.
x The coating film appearance is extremely ununiform.
Appearance Evaluation (Ra(2.5))

Using SJ-210 (manufactured by Mitutoyo), the arithmetic average roughness (Ra(2.5)) of a coating film surface (excluding wavelengths of 2.5 mm or more) was measured. The thickness of the coating film was 20 μm, the measurement was performed 5 times, and the average thereof was taken.

The measurement conditions were a cutoff wavelength of 2.5 mm or more and a scanning speed of 0.5 mm/sec.

TABLE 1

| | | Example 1 | Example 2 | Example 3 | Example 4 | Example 5 | Example 6 | Example 7 |
|---|---|---|---|---|---|---|---|---|
| Metal compound (B) | Y | 0.05 | | | | | | 0.05 |
| | La | | 0.05 | | | | 0.04 | |
| | Ce | | | 0.05 | | | | |
| | Nd | | | | 0.05 | | | |
| | Bi | | | | | 0.05 | 0.01 | |
| Total amount (% by mass) | | 0.05 | 0.05 | 0.05 | 0.05 | 0.05 | 0.05 | 0.05 |
| Silicone compound (C) | | 0.008 | 0.008 | 0.008 | 0.008 | 0.008 | 0.008 | 3.8 |
| Appearance | Visual observation | ○ | ○ | ○ | ○ | ○ | ○ | ○Δ |
| | Ra (2.5) | 0.2 | 0.17 | 0.23 | 0.19 | 0.19 | 0.22 | 0.23 |
| Cratering | Flowing | ○ | ○ | ○Δ | ○ | ○Δ | ○ | ⊙ |
| | Contamination | ○Δ | ○Δ | ○Δ | ○Δ | ○Δ | ○Δ | ⊙ |

TABLE 2

| | | Example 8 | Example 9 | Example 10 | Example 11 | Example 12 | Example 13 | Example 14 |
|---|---|---|---|---|---|---|---|---|
| Metal compound (B) | Y | | | | | | 1 | |
| | La | 0.05 | | | | 0.04 | | 1 |
| | Ce | | 0.05 | | | | | |
| | Nd | | | 0.05 | | | | |
| | Bi | | | | 0.05 | 0.01 | | |
| Total amount (% by mass) | | 0.05 | 0.05 | 0.05 | 0.05 | 0.05 | 1 | 1 |
| Silicone compound (C) | | 3.8 | 3.8 | 3.8 | 3.8 | 3.8 | 1.25 | 1.25 |
| Appearance | Visual observation | ○Δ | ○Δ | ○Δ | ○Δ | ○Δ | ○ | ○ |
| | Ra (2.5) | 0.24 | 0.21 | 0.26 | 0.19 | 0.25 | 0.19 | 0.21 |
| Cratering | Flowing | ⊙ | ⊙ | ⊙ | ⊙ | ⊙ | ⊙ | ⊙ |
| | Contamination | ○ | ⊙ | ⊙ | ⊙ | ○ | ○ | ○ |

TABLE 3

| | | Example 15 | Example 16 | Example 17 | Example 18 | Example 19 | Example 20 | Example 21 | Example 22 |
|---|---|---|---|---|---|---|---|---|---|
| Metal compound (B) | Y | | | | | 3 | | | |
| | La | | | | 0.8 | | 3 | | |
| | Ce | 1 | | | | | | 3 | |
| | Nd | | 1 | | | | | | 3 |
| | Bi | | | 1 | 0.2 | | | | |
| Total amount (% by mass) | | 1 | 1 | 1 | 1 | 3 | 3 | 3 | 3 |
| Silicone compound (C) | | 1.25 | 1.25 | 1.25 | 1.25 | 0.008 | 0.008 | 0.008 | 0.008 |
| Appearance | Visual observation | ○ | ○ | ○ | ○ | ○ | ○Δ | ○Δ | ○Δ |
| | Ra (2.5) | 0.2 | 0.22 | 0.18 | 0.2 | 0.2 | 0.22 | 0.24 | 0.25 |
| Cratering | Flowing | ⊙ | ⊙ | ⊙ | ⊙ | ○ | ○ | ○ | ○ |
| | Contamination | ⊙ | ⊙ | ○ | ⊙ | ○Δ | ○Δ | ○Δ | ○Δ |

TABLE 4

| | | Example 23 | Example 24 | Example 25 | Example 26 | Example 27 | Example 28 | Example 29 | Example 30 |
|---|---|---|---|---|---|---|---|---|---|
| Metal compound (B) | Y | | | 3 | | | | | |
| | La | | 2.4 | | 3 | | | | 2.4 |
| | Ce | | | | | 3 | | | |
| | Nd | | | | | | 3 | | |
| | Bi | 3 | 0.6 | | | | | 3 | 0.6 |
| | Total amount (% by mass) | 3 | 3 | 3 | 3 | 3 | 3 | 3 | 3 |
| | Silicone compound (C) | 0.008 | 0.008 | 3.8 | 3.8 | 3.8 | 3.8 | 3.8 | 3.8 |
| Appearance | Visual observation | ○ | ○Δ | ○Δ | ○Δ | ○Δ | ⊙ | ○Δ | ○Δ |
| | Ra (2.5) | 0.19 | 0.25 | 0.27 | 0.25 | 0.28 | 0.24 | 0.22 | 0.25 |
| Cratering | Flowing | ○Δ | ○ | ⊙ | ⊙ | ⊙ | ⊙ | ⊙ | ⊙ |
| | Contamination | ○Δ | ○Δ | ⊙ | ○ | ⊙ | ⊙ | ⊙ | ⊙ |

TABLE 5

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Metal compound (B) | Y | 0.025 | | | | | | 0.025 |
| | La | | 0.025 | | | | 0.02 | |
| | Ce | | | 0.025 | | | | |
| | Nd | | | | 0.025 | | | |
| | Bi | | | | | 0.025 | 0.005 | |
| | K | | | | | | | |
| | Ca | | | | | | | |
| | Total amount (% by mass) | 0.025 | 0.025 | 0.025 | 0.025 | 0.025 | 0.025 | 0.025 |
| | Silicone compound (C) | 0.004 | 0.004 | 0.004 | 0.004 | 0.004 | 0.004 | 5 |
| | Acrylic resin | | | | | | | |
| Appearance | Visual observation | ○ | ○ | ○ | ○ | ○ | ○ | Δ |
| | Ra (2.5) | 0.16 | 0.18 | 0.15 | 0.22 | 0.18 | 0.21 | 0.29 |
| Cratering | Flowing | x | x | x | x | x | x | ⊙ |
| | Contamination | x | x | x | x | x | x | ⊙ |

TABLE 6

| | | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|
| Metal compound (B) | Y | | | | | | 4 | |
| | La | 0.025 | | | | 0.02 | | 4 |
| | Ce | | 0.025 | | | | | |
| | Nd | | | 0.025 | | | | |
| | Bi | | | | 0.025 | 0.005 | | |
| | K | | | | | | | |
| | Ca | | | | | | | |
| | Total amount (% by mass) | 0.025 | 0.025 | 0.025 | 0.025 | 0.025 | 4 | 4 |
| | Silicone compound (C) | 5 | 5 | 5 | 5 | 5 | 0.004 | 0.004 |
| | Acrylic resin | | | | | | | |
| Appearance | Visual observation | x | x | x | Δ | Δ | x | Δ |
| | Ra (2.5) | 0.37 | 0.39 | 0.36 | 0.31 | 0.28 | 0.33 | 0.3 |
| Cratering | Flowing | ⊙ | ⊙ | ⊙ | ⊙ | ⊙ | x | x |
| | Contamination | ⊙ | ⊙ | ⊙ | ⊙ | ⊙ | x | x |

TABLE 7

| | | Comparative Example 15 | Comparative Example 16 | Comparative Example 17 | Comparative Example 18 | Comparative Example 19 | Comparative Example 20 | Comparative Example 21 |
|---|---|---|---|---|---|---|---|---|
| Metal compound (B) | Y | | | | | 4 | | |
| | La | | | | 3.25 | | 4 | |
| | Ce | 4 | | | | | | 4 |
| | Nd | | 4 | | | | | |
| | Bi | | | 4 | 0.75 | | | |
| | K | | | | | | | |
| | Ca | | | | | | | |
| Total amount (% by mass) | | 4 | 4 | 4 | 4 | 4 | 4 | 4 |
| Silicone compound (C) | | 0.004 | 0.004 | 0.004 | 0.004 | 5 | 5 | 5 |
| Acrylic resin | | | | | | | | |
| Appearance | Visual observation | x | Δ | x | x | x | x | x |
| | Ra (2.5) | 0.35 | 0.29 | 0.32 | 0.38 | 0.38 | 0.34 | 0.32 |
| Cratering | Flowing | Δ | Δ | x | Δ | ⊙ | ⊙ | ⊙ |
| | Contamination | x | x | x | x | ⊙ | ⊙ | ⊙ |

TABLE 8

| | | Comparative Example 22 | Comparative Example 23 | Comparative Example 24 | Comparative Example 25 | Comparative Example 26 | Comparative Example 27 |
|---|---|---|---|---|---|---|---|
| Metal compound (B) | Y | | | | | | |
| | La | | | 3.25 | | | 0.8 |
| | Ce | | | | | | |
| | Nd | 4 | | | | | |
| | Bi | | 4 | 0.75 | | | 0.2 |
| | K | | | | 1 | | |
| | Ca | | | | | 1 | |
| Total amount (% by mass) | | 4 | 4 | 4 | 1 | 1 | 1 |
| Silicone compound (C) | | 5 | 5 | 5 | 1.25 | 1.25 | |
| Acrylic resin | | | | | | | 1.25 |
| Appearance | Visual observation | x | x | x | ○ | ○Δ | ○Δ |
| | Ra (2.5) | 0.39 | 0.35 | 0.4 | 0.16 | 0.25 | 0.27 |
| Cratering | Flowing | ⊙ | ⊙ | ⊙ | x | Δ | x |
| | Contamination | ⊙ | ⊙ | ⊙ | x | x | x |

It was confirmed that each of the cationic electrodeposition coating compositions of the above-described Examples had good anti-cratering property against both flowing oil cratering and oil contamination cratering. Furthermore, it was confirmed that each of the resulting cured electrodeposition coating films had a good coating film appearance and a low Ra value.

Comparative Examples 1 to 24 are examples in which the contents of the metal compound (B) and the silicone compound (C) are out of the above ranges. In these experimental examples, it was confirmed that one or both of the anti-cratering property and the coating film appearance were poor.

Comparative Example 25 is an example in which a metal compound comprising potassium (K) as a monovalent metal element was used. Comparative Example 26 is an example in which a metal compound comprising calcium (Ca) as a divalent metal element was used. In all of these Comparative Examples, it was confirmed that the anti-cratering was poor.

Comparative Example 27 is an experimental example in which an acrylic resin was used instead of a silicone compound. The SP value of the acrylic resin used in this Comparative Example is high and is close to the SP value of the silicone compound used in the Examples. In this Comparative Example, however, it was confirmed that the anti-cratering property was not obtained.

INDUSTRIAL APPLICABILITY

The cationic electrodeposition coating composition has good anti-cratering performance. The use of the cationic electrodeposition coating composition is advantageous in that a cured electrodeposition coating film having a good coating film appearance can be formed.

This application claims priority based on Japanese Patent Application No. 2019-129248, which was filed in Japan on Jul. 11, 2019, the disclosure of which application is incorporated herein by reference in its entirety.

The invention claimed is:

1. A cationic electrodeposition coating composition comprising a coating film-forming resin (A), a silicone compound (C), and a pigment dispersion paste, wherein the pigment dispersion paste comprises a metal compound (B) containing a trivalent metal element, a pigment dispersion resin, a capping agent, and a pigment, the capping agent comprises one or more species selected from the group consisting of an amine-modified epoxy resin having a hydroxyl value of 150 mg KOH/g or more and 650 mg KOH/g or less and an amine value of 30 mg KOH/g or more and 190 mg KOH/g or less, and a polyvalent acid, a content of the metal compound (B) is 0.03 parts by mass or more and less than 4 parts by mass in terms of a metal element based on 100 parts by mass of a resin solid content of the coating film-forming resin (A), a content of the silicone compound (C) is 0.005 parts by mass or more and 4.5 parts by mass or less based on 100 parts by mass of the resin solid content of the coating film-forming resin (A), the metal element contained in the metal compound (B) is one or more selected from the group consisting of Y, La, Ce, Nd, Pr, Yb, and Bi, and a SP value of the silicone compound (C) is 12.0 or more and 15.0 or less.

2. The cationic electrodeposition coating composition according to claim 1, wherein the silicone compound (C) is at least one species selected from the group consisting of a polyether modified silicone compound (C-1), a polyester modified silicone compound (C-2), and a polyacrylic modified silicone compound (C-3).

3. A method for forming a cured electrodeposition coating film, the method comprising:

forming an uncured electrodeposition coating film by immersing an article to be coated in the cationic electrodeposition coating composition according to claim 2 and performing electrodeposition coating; and heating and curing the uncured electrodeposition coating film to form a cured electrodeposition coating film on the article.

4. The cationic electrodeposition coating composition according to claim 1, wherein the silicone compound (C) is soluble or dispersible in an aqueous solvent.

5. A method for forming a cured electrodeposition coating film, the method comprising:

forming an uncured electrodeposition coating film by immersing an article to be coated in the cationic electrodeposition coating composition according to claim 4 and performing electrodeposition coating; and heating and curing the uncured electrodeposition coating film to form a cured electrodeposition coating film on the article.

6. A method for forming a cured electrodeposition coating film, the method comprising:

forming an uncured electrodeposition coating film by immersing an article to be coated in the cationic electrodeposition coating composition according to claim 1 and performing electrodeposition coating; and heating and curing the uncured electrodeposition coating film to form a cured electrodeposition coating film on the article.

* * * * *